United States Patent
Kawaguchi et al.

(10) Patent No.: US 7,730,541 B2
(45) Date of Patent: Jun. 1, 2010

(54) DATA PROCESSING APPARATUS INCLUDING DATA ERASURE IN RESPONSE TO POWER LOSS AND DATA ERASING METHOD THEREFOR

(75) Inventors: Tadashi Kawaguchi, Tokyo (JP); Hideki Hirose, Tokyo (JP); Kei Morita, Kawasaki (JP); Eijiro Atarashi, Toride (JP); Takahiro Haraguchi, Kawasaki (JP); Fumio Mikami, Chigasaki (JP)

(73) Assignee: Canon Kabushiki Kaisha (JP)

( * ) Notice: Subject to any disclaimer, the term of this patent is extended or adjusted under 35 U.S.C. 154(b) by 1057 days.

(21) Appl. No.: 11/233,512

(22) Filed: Sep. 22, 2005

(65) Prior Publication Data

US 2006/0080494 A1 Apr. 13, 2006

(30) Foreign Application Priority Data

Sep. 22, 2004 (JP) .............................. 2004-275146

(51) Int. Cl.
*G06F 1/30* (2006.01)
*G05B 9/00* (2006.01)
*H02J 7/00* (2006.01)

(52) U.S. Cl. .............................. 726/26; 726/36; 700/82; 320/167

(58) Field of Classification Search .................... 726/36; 700/82; 320/167
See application file for complete search history.

(56) References Cited

U.S. PATENT DOCUMENTS

| | | | | |
|---|---|---|---|---|
| 4,882,752 A | * | 11/1989 | Lindman et al. ............ 713/166 |
| 5,634,109 A | * | 5/1997 | Chen et al. ................... 711/143 |
| 5,892,900 A | * | 4/1999 | Ginter et al. .................. 726/26 |
| 6,292,898 B1 | * | 9/2001 | Sutherland .................... 726/34 |
| 2002/0126843 A1 | * | 9/2002 | Murase et al. ............... 380/201 |
| 2003/0005323 A1 | * | 1/2003 | Hanley et al. ............... 713/194 |
| 2004/0114173 A1 | * | 6/2004 | Bunker ....................... 358/1.14 |
| 2004/0114182 A1 | * | 6/2004 | Davis ........................ 358/1.16 |
| 2004/0227494 A1 | * | 11/2004 | Swanson et al. ............. 323/268 |
| 2005/0013274 A1 | * | 1/2005 | Pekonen et al. ............. 370/329 |
| 2009/0031095 A1 | * | 1/2009 | Merry et al. ................. 711/159 |

FOREIGN PATENT DOCUMENTS

| | | |
|---|---|---|
| JP | 09-83761 A | 3/1997 |
| JP | 11-187184 A | 7/1999 |
| JP | 2003-037719 A | 2/2003 |
| JP | 2004-72711 A | 3/2004 |
| JP | 2004-104581 A | 4/2004 |

* cited by examiner

*Primary Examiner*—Matthew T Henning
(74) *Attorney, Agent, or Firm*—Rossi, Kimms & McDowell LLP

(57) ABSTRACT

A data processing apparatus secures data from third parties in event of power loss by utilizing a backup power supply to provide power while data is erased from memory. The data is stored in a nonvolatile memory. A first voltage supply unit supplies voltage to the memory, and a second voltage unit supplies voltage to the memory when the first voltage supply unit is incapable of supplying voltage to the memory. When the first voltage supply unit becomes incapable of supplying voltage to the memory, the memory is controlled to erase the data stored therein using a selected one of a plurality of erasing processes depending on the status of processing of the data.

8 Claims, 14 Drawing Sheets

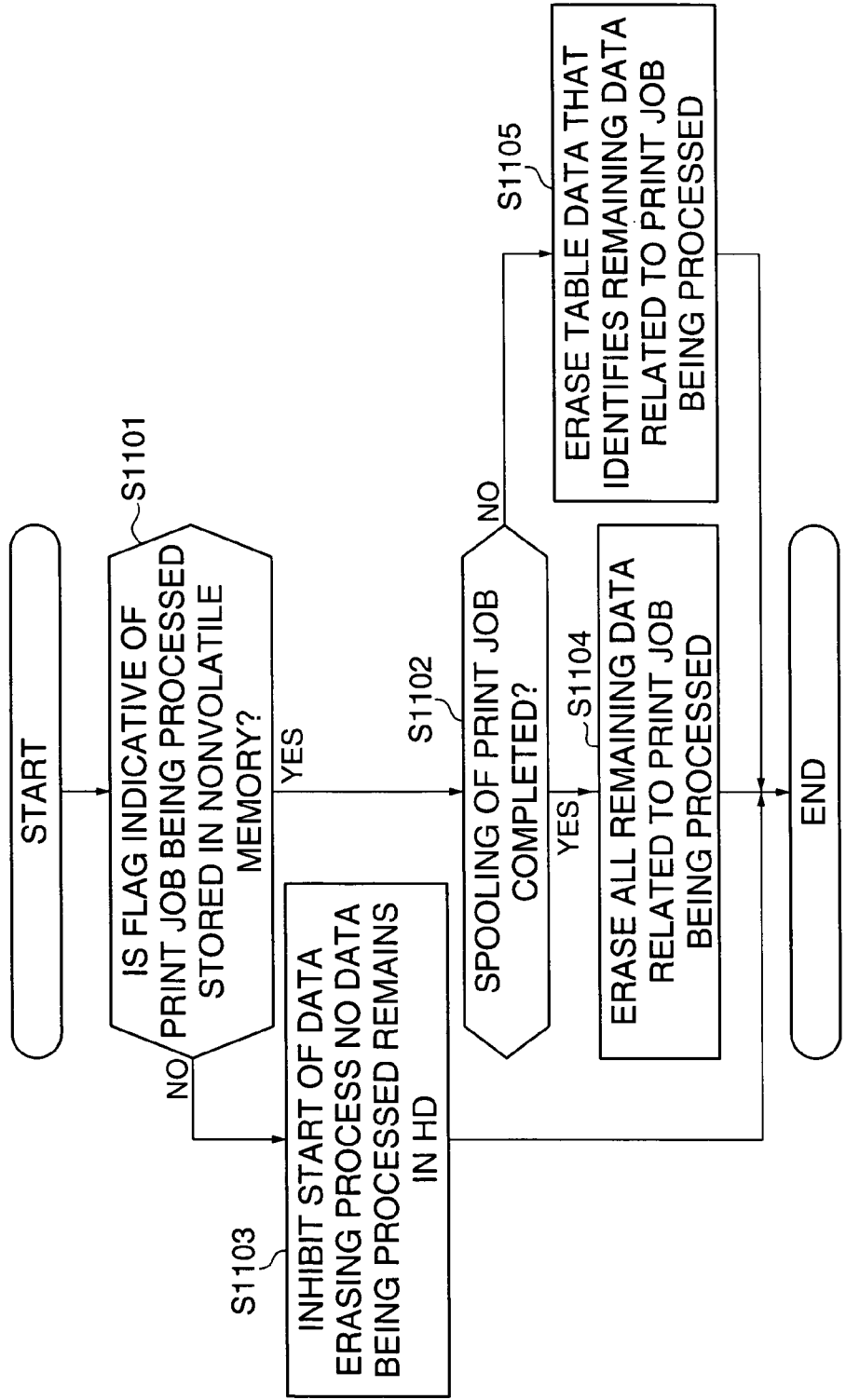

DATA PROCESSING APPARATUS INCLUDING DATA ERASURE IN RESPONSE TO POWER LOSS AND DATA ERASING METHOD THEREFOR

BACKGROUND OF THE INVENTION

1. Field of the Invention

The present invention relates to a data processing apparatus, a data erasing method therefore, and a program for implementing the method.

2. Description of the Related Art

Conventional image forming apparatuses (data processing apparatuses) are configured such that copying or printing stops when shutdown of commercial power supply such as a power failure or an instantaneous interruption over a relatively long period of time occurs in the image forming apparatus. Then, irrespective of the type of a job being processed at a time point the power shutdown occurred, print data generated by the job remains as incomplete data in a storage medium such as a hard disk. As a result, when power supply to the image forming apparatus is turned on next time, the incomplete data remaining in the storage medium is regarded as improper data. Then, the image forming apparatus erases related table data such as FAT (File Allocation Table) to cut off the relationship with the print data.

Also, when a power shutdown occurs while print data is being stored in a HD (hard disk) in the image forming apparatus, a sector or sectors in the HD become bad during writing. Then, when power supply to the image forming apparatus is turned next time, there is the possibility that the sector/sectors is/are unusable as bad sector(s). To cope with this, it can be envisaged that the voltage supply is switched from a normally used DC power supply to a backup power supply when a power shutdown occurs.

On the other hand, there has been known an image forming apparatus that is capable of executing a print job with a password for improvement of security (hereinafter referred to as "the secure job") as well as a normal print job (hereinafter referred to as "the normal job"). The secure job comprised of transmitting print data to which a password that can be set with respect to each user is added from an external apparatus such as a personal computer to the image forming apparatus, so that the secure job is not printed out insofar as a user directly enters the password from the image forming apparatus.

Further, there has been proposed a technique that can properly cope with a request to immediately shut down power supply without causing any serious problems even in the case where a power switch is unexpectedly turned off by a user. According to this technique, when an operation detecting section detects power shutdown, the power supply is switched to a backup power supply, so that data on a RAM is transmitted to an external apparatus via a network or data is saved from a volatile storage device in a nonvolatile storage device, and then the power shutdown is notified (see Japanese Laid-Open Patent Publication (Kokai) No. 2004-072711, for example).

In the above conventional image forming apparatus, however, irrespective of whether a job to be executed by the image forming apparatus is the secure job or the normal job, the same process is carried out upon abnormal power shutdown in which power supply to the image forming apparatus is abnormally shut down. That is, when an abnormal power shutdown occurs, the image forming apparatus determines that print data being processed is improper data in the same manner as mentioned above. When the supply of voltage to the image forming apparatus is resumed, the image forming apparatus erases related table data such as FAT.

Once an abnormal power shutdown occurs in the image forming apparatus, the image forming apparatus cannot be caused to execute the secure job even if a user who has input the secure job from an external apparatus such as a personal computer (PC) attempts to enter a password to the image forming apparatus, because the image forming apparatus pauses due to the cutoff of power supply thereto. The user is very concerned about the location of the print data that has been completely transmitted from the PC to the image forming apparatus, which raises a problem in terms of security.

There are the following job processing statuses in the image forming apparatus when an abnormal power shutdown occurs.

(1) The status as to whether or not a print data job input from a PC is being processed (2) The status as to progress of job processing in the case where the job is being processed (2-1) The status as to storage of PDL data in a receiving buffer in the image forming apparatus (2-2) The status as to creation of various bitmap data by generating a drawing command list from the PDL data (2-3) The status as to spooling of the bitmap data that has been completely drawn In the above conventional image forming apparatus, however, the method of handling print job data being processed when an abnormal power shutdown occurs is not variable at any of the job processing stages mentioned above. Thus, there is the disadvantage that if bitmap data that has been completely drawn remains in the HD of the image forming apparatus as it is or in a compressed form, a third party can maliciously steal a look at and parse the data.

Also, even the image forming apparatus that employs the switching method in which the power supply is switched from a DC power supply to a backup power supply when an abnormal power shutdown occurs, it is a matter of course that the residual power supply capacity of the backup power supply decreases as the operating time of the backup power supply increase. However, since the system terminating process to be carried out in response to abnormal power shutdown is not variable so as to cope with changes in the power supply capacity of the backup power supply, the residual power supply capacity of the backup power supply cannot be effectively used because it is limited by the system terminating process to be carried out.

SUMMARY OF THE INVENTION

It is an object of the present invention to provide a data processing apparatus and a data erasing method therefore that are capable of suppressing the capacity of a backup power supply to be used (operating time) and eliminating the disadvantage that a third party steals a look at data to thereby improve security, and a program for implementing the method.

To attain the above object, in a first aspect of the present invention, there is provided a data processing apparatus comprising an input unit that inputs data, a data processing unit that performs predetermined processing on the data input by the input unit, a nonvolatile storage unit that stores the data on which the processing has been performed by the data processing unit, a first voltage supply unit that supplies voltage to the storage unit, a second voltage supply unit that supplies voltage to the storage unit when the first voltage supply unit is incapable of supplying voltage to the storage unit, and a control unit responsive to the first voltage supply unit becoming incapable of supplying voltage to the storage unit, for controlling the storage unit to erase the data stored in the storage unit, using a selected one of a plurality of erasing processes depending on a status of processing of the data by the data processing unit.

With the arrangement of the first aspect of the present invention, the data stored in the storage unit that stores input data is erased using an appropriate erasing process depending on the status of processing of the data, in response to switching of the source of voltage supply to the storage unit from the first voltage supply unit to the second voltage supply unit. As a result, it is possible to suppress the capacity of a backup power supply to be used (operating time) and to eliminate the disadvantage that a third party steals a look at data to thereby improve security.

Preferably, the data processing apparatus comprises an image forming unit that forms an image, and the input unit comprises a determining unit that inputs the data received from an external apparatus and determines whether predetermined authentication information is included in the input data, and an authenticating unit that carries out authentication corresponding to the predetermined authentication information so as to cause the image forming unit to form an image based on the data including the predetermined authentication information.

More preferably, when the predetermined authentication information is included in the data, the control unit carries out a first erasing process in which all of the data stored in the storage unit is erased, and when the predetermined authentication information is not included in the data, the control unit carries out the first erasing process or a second erasing process in which part of the data is erased, depending on the status of processing of the data.

Still more preferably, the status of processing of the data is indicative of whether the data processing unit has carried out the predetermined processing on all of the data.

Preferably, the data processing apparatus further comprises a detecting unit that detects an amount of electric power that can be supplied from the second voltage supply unit to the storage unit, and the control unit selects one of the plurality of erasing processes based on the amount of electric power detected by the detecting unit and an amount of the data.

More preferably, the data processing apparatus further comprises a determining unit that determines an amount of data that can be erased from the storage unit by the amount of electric power detected by the detecting unit, and the control unit selects one of the plurality of erasing processes based on whether the amount of the data is greater than the amount of data that can be erased.

Preferably, the data processing apparatus further comprises an image forming unit that forms an image based on data generated by the predetermined processing performed on the data by the data processing unit.

To attain the above object, in a second aspect of the present invention, there is provided a data erasing method executed by data processing apparatus, comprising an input step of inputting data, a data processing step of performing predetermined processing on the data input in the input step, a storage step of storing the data on which the processing has been performed in the data processing step in a storage unit, a switching step of switching a source of voltage supply to the storage unit from a first voltage supply unit to a second voltage supply unit when the first voltage supply unit is incapable of supplying voltage to the storage unit, and an erasing step of erasing the data in response to the switching of the source of voltage supply from the first voltage supply unit to the second voltage supply unit in the switching step, using a selected one of a plurality of erasing processes depending on a status of processing of the data in the data processing step.

Preferably, the data erasing method comprises an image forming step of forming an image based on data generated by the predetermined processing performed on the data in the data processing step.

To attain the above object, in a third aspect of the present invention, there is provided a data processing apparatus comprising an input unit that inputs data, a data processing unit that performs predetermined processing on the data input by the input unit, a nonvolatile storage unit that stores the data on which the processing has been performed by the data processing unit, a first voltage supply unit that supplies voltage to the storage unit, a second voltage supply unit that supplies voltage to the storage unit when the first voltage supply unit is incapable of supplying voltage to the storage unit, and a control unit responsive to the first voltage supply unit becoming incapable of supplying voltage to the storage unit, for causing the storage unit to store a status of processing of the data by the data processing unit, and responsive to resumption of supply of voltage from the first voltage supply unit to the storage unit, for erasing the data using a selected one of a plurality of erasing processes depending on the status of processing of the data.

With the arrangement of the third aspect of the present invention, it is possible to improve security and cope with the phenomenon in which the amount of data that can be erased during execution of the system terminating process decreases as the operating time of the backup power supply increases.

Preferably, the data processing apparatus comprises an image forming unit that forms an image, and the input unit comprises a determining unit that inputs the data received from an external apparatus and determines whether predetermined authentication information is included in the input data, and an authenticating unit that carries out authentication corresponding to the predetermined authentication information so as to cause the image forming unit to form an image based on the data including the predetermined authentication information.

More preferably, when the predetermined authentication information is included in the data, the control unit carries out a first erasing process in which all of the data stored in the storage unit is erased, and when the predetermined authentication information is not included in the data, the control unit causes the storage unit to store the status of processing of the data in response to switching of a source of voltage supply from the first voltage supply unit to the second voltage supply unit, and erases the data using a selected one of the plurality of erasing processes depending on the status of processing of the data in response to resumption of voltage supply from the first voltage supply unit to the storage unit.

Still more preferably, the status of processing of the data is indicative of whether the data processing unit has carried out the predetermined processing on all of the data.

Preferably, the data processing apparatus further comprises an image forming unit that forms an image based on data generated by the predetermined processing performed on the data by the data processing unit.

To attain the above object, in a fourth aspect of the present invention, there is provided a data erasing method executed by a data processing apparatus, comprising an input step of inputting data, a data processing step of performing predetermined processing on the data input in the input step, a storage step of storing the data on which the processing has been performed in the data processing step in a storage unit, a switching step of switching a source of voltage supply to the storage unit from a first voltage supply unit to a second voltage supply unit when the first voltage supply unit is incapable of supplying voltage to the storage unit, and an erasing step of causing the storage unit to store a status of processing of the data in response to the switching of the source of voltage supply from the first voltage supply unit to the second voltage supply unit in the switching step, and erasing the data using a selected one of a plurality of erasing processes depending on the status of processing of the data after resumption of voltage supply from the first voltage supply unit to the storage unit.

Preferably, the data erasing method comprises an image forming step of forming an image based on data generated by the predetermined processing performed on the data in the data processing step.

To attain the above object, in a fifth aspect of the present invention, there is provided a program for causing a computer to implement data erasing method executed by a data processing apparatus, comprising an input module for inputting data, a data processing module for performing predetermined processing on the data input by the input module, a storage module for storing the data on which the processing has been performed by the data processing module in a storage unit, a switching module for switching a source of voltage supply to the storage unit from a first voltage supply unit to a second voltage supply unit when the first voltage supply unit is incapable of supplying voltage to the storage unit, and an erasing module for erasing the data in response to the switching of the source of voltage supply from the first voltage supply unit to the second voltage supply unit by the switching module, using a selected one of a plurality of erasing processes depending on a status of processing of the data by the data processing module.

To attain the above object, in a sixth aspect of the present invention, there is provided a program for causing a computer to implement data erasing method executed by a data processing apparatus, comprising an input module for inputting data, a data processing module for performing predetermined processing on the data input by the input module, a storage module for storing the data on which the processing has been performed by the data processing module in a storage unit, a switching module for switching a source of voltage supply to the storage unit from a first voltage supply unit to a second voltage supply unit when the first voltage supply unit is incapable of supplying voltage to the storage unit, and an erasing module for causing the storage unit to store a status of processing of the data in response to the switching of the source of voltage supply from the first voltage supply unit to the second voltage supply unit by the switching module, and erasing the data using a selected one of a plurality of erasing processes depending on the status of processing of the data after resumption of voltage supply from the first voltage supply unit to the storage unit.

The above and other objects, features and advantages of the invention will be more apparent from the following detailed description taken in conjunction with the accompanying drawings.

BRIEF DESCRIPTION OF THE DRAWINGS

FIG. 11 is a flow chart showing a process in which data in a hard disk is erased in the case where after the connection between the image forming apparatus according to the second embodiment and the AC power supply is shut off due to an unexpected power shutdown, the image forming apparatus and the AC power supply are reconnected to each other, and power supply to the image forming apparatus is turned on by a DC power supply.

DETAILED DESCRIPTION OF THE PREFERRED EMBODIMENTS

The present invention will be described in detail with reference to the drawings showing preferred embodiments thereof.

Figure 1:
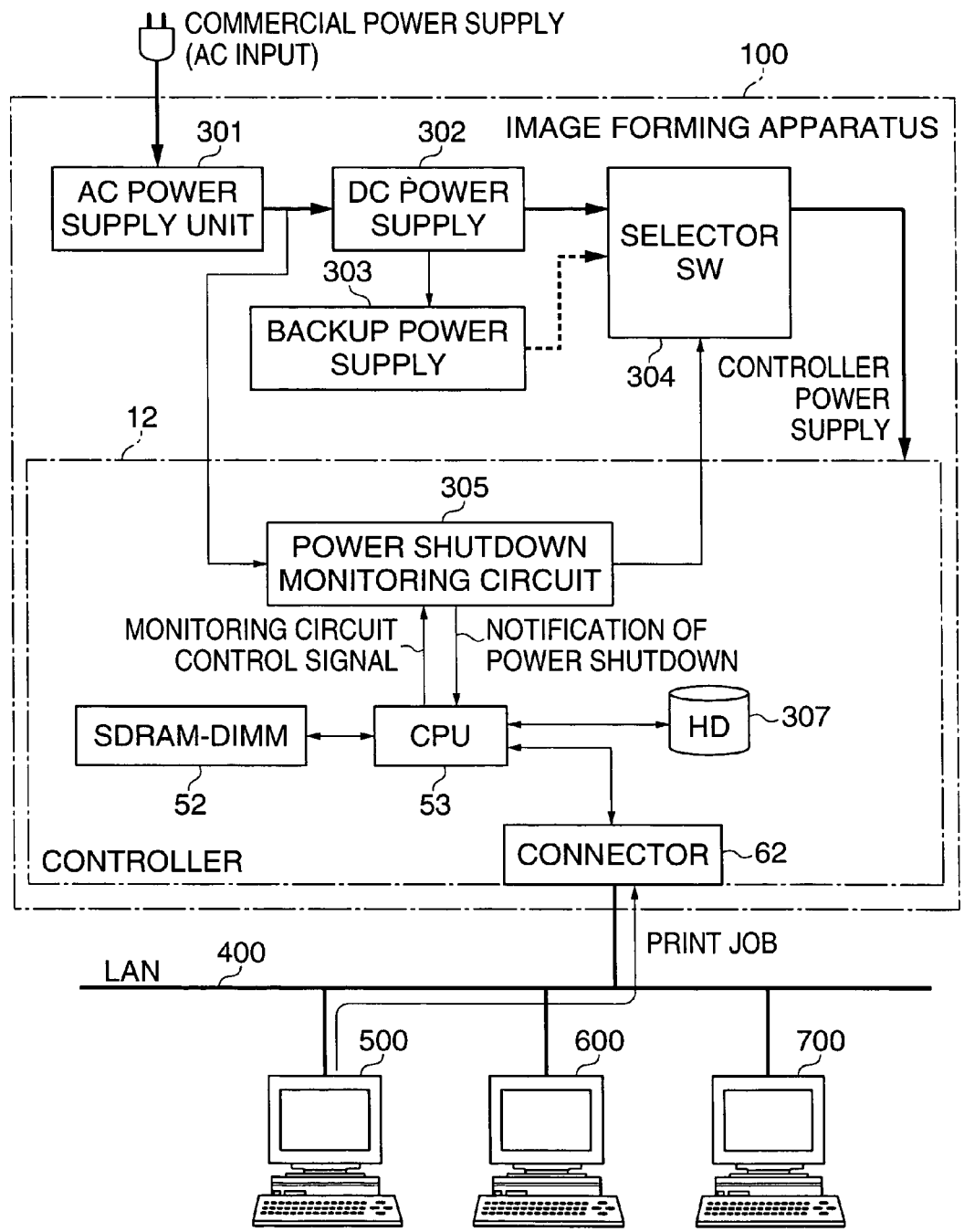
FIG. 1 is a block diagram showing the overall construction of a job control system including an image forming apparatus as a data processing apparatus according to a first embodiment of the present invention.
Figure 2:
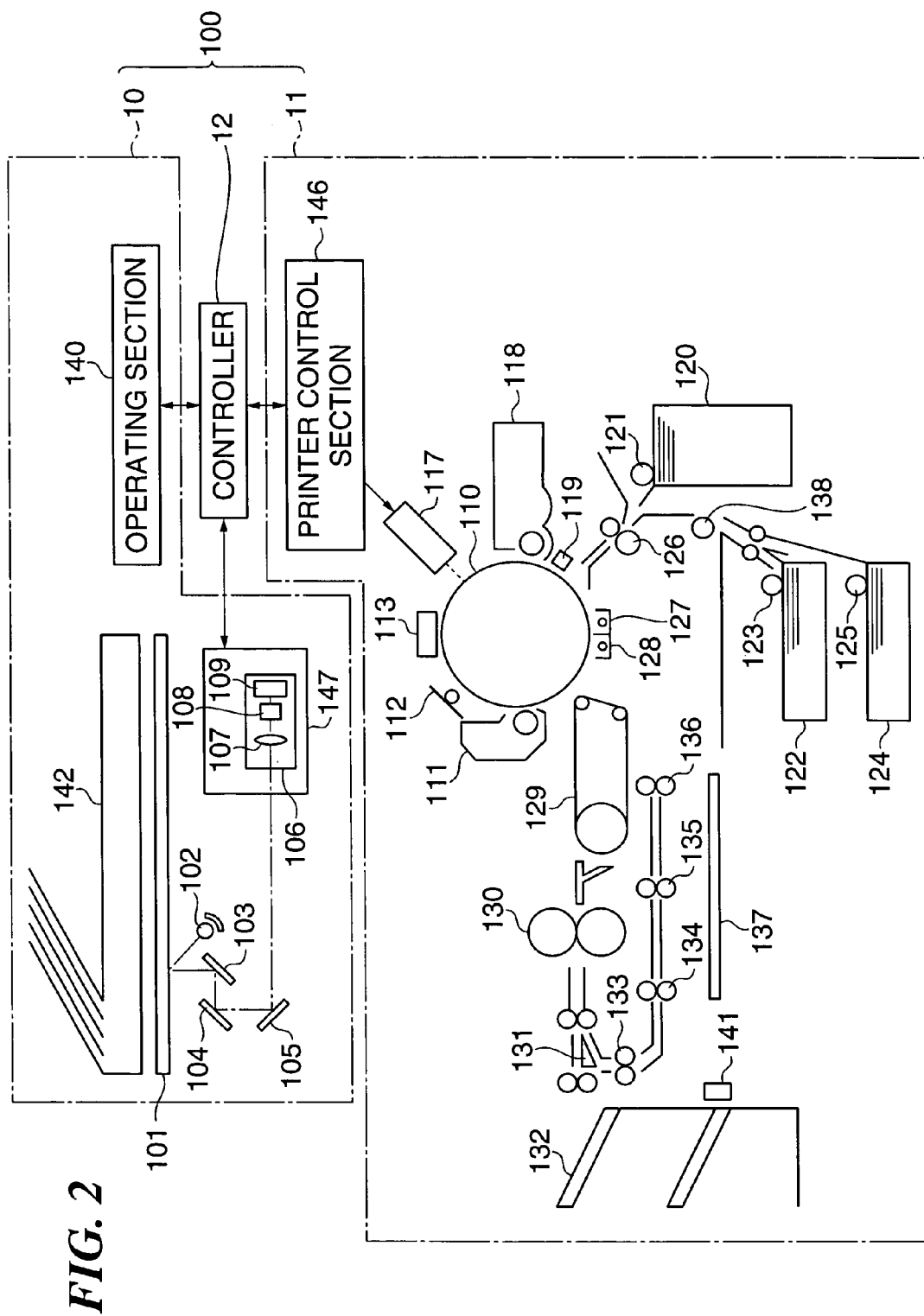
FIG. 2 is a diagram showing the internal construction of the image forming apparatus in FIG. 1.

FIG. 1 is a block diagram showing the overall construction of a job control system including an image forming apparatus as a data processing apparatus according to a first embodiment of the present invention. FIG. 2 is a diagram showing the internal construction of the image forming apparatus in FIG. 1.

First, a description will be given of the internal construction of the image forming apparatus according to the present embodiment with reference to FIG. 2. The image forming apparatus 100 is comprised of a reader section 10 that carries out an image reading process (image input process) in which image data is input by reading an image from an original, a printer section 11 that carries out an image forming process in which an image is formed on a sheet based on the image data, and a controller 12 that controls the overall operation of the image forming apparatus 100.

First, a description will be given of the construction of the reader section 10. Originals fed from an automatic original feeder 142 are sequentially placed at a predetermined location on an original tray glass 101. An original placed on the original tray glass 101 is exposed to light from an original illumination lamp 102 comprised of a halogen lamp, for example. Scanning mirrors 103, 104, and 105 are accommodated in an optical scanning unit, for guiding reflected light from an original to a CCD unit 106 while moving back and forth.

The CCD unit 106 is comprised of an image forming lens 107 that causes reflected light from an original to form an image on a CCD, an image pickup device 108 comprised of a CCD, a CCD driver 109 that drives the image pickup device 108, and so forth. The CCD unit 106 is controlled by a reader control section 147. An image signal output from the image pickup device 108 is converted into, for example, 8-bit digital data and shading-corrected by the reader control section 147 and then input to the controller 12, so that various kinds of image processing are performed on the image signal.

Next, a description will be given of the construction of the controller 12, although a detailed description will be given later of the controller 12 that plays a central role in controlling the image forming apparatus 100. An operating section 140, the reader controller 147, and a printer controller 146 are connected to the controller 12. The controller 12 controls the reader section 10 and the printer section 11 in accordance with instructions input from the operating section 140, for causing the reader section 10 and the printer section 11 to carry out an image reading process and an image forming process, respectively. Also, the controller 12 carries out communication with an external apparatus such as a PC via a network; e.g. reception of a print job as information related to image data based on which an image is to be formed by the printer 11 from the external apparatus and transmission of the status of the printer 11 to the external apparatus (see FIG. 1).

A description will now be given of the construction of the printer section 11. Electric charge is removed from a photosensitive drum 110 by a pre-exposure lamp 112 in preparation for image formation. A cleaner 111 cleans the surface of the photosensitive drum 110. A primary charger 113 uniformly charges the photosensitive drum 110. A laser unit 117 is an exposure means implemented by, for example, a semiconductor laser, for exposing the photosensitive drum 110 to light based on image data processed by the controller 12 to thereby form an electrostatic latent image on the photosensitive drum 110. A developing unit 118 accommodates a black developer (toner), for developing the electrostatic latent image on the photosensitive drum 110. A pre-transfer charger 119 applies high voltage to a toner image developed on the photosensitive drum 110 before the toner image is transferred to a sheet.

Sheet feeding units 120, 122, and 124 are each capable of storing a plurality of sheets, and sheet feeding rollers 121, 123, and 125 are driven to feed sheets from the corresponding sheet feeding units 120, 122, and 124, respectively. A sheet fed from any of the sheet feeding units 120, 122, and 124 is temporarily stopped at the location of a resist roller 126, and then writing timing and sheet feed timing in transferring a toner image developed on the photosensitive drum 110 to a sheet are adjusted. Thereafter, feeding of the sheet is resumed.

A transfer charger 127 transfers a toner image developed on the photosensitive drum 110 to a sheet being fed. A separation charger 128 separates the sheet to which the toner image has been completely transferred from the photosensitive drum 110. The toner remaining on the photosensitive drum 110 without been transferred to the sheet is collected by the cleaner 111. A conveying belt 129 conveys the sheet to which the toner image has been completely transferred to a fixing device 130. The fixing device 130 is comprised of rollers, a heater, and so forth, for fixing the toner image to the sheet by heat or the like. A flapper 131 switches the path of the sheet onto which the toner image has been completely fixed between a path toward a staple sorter 132 or a path toward an intermediate tray 137.

The sheets discharged onto the staple sorter 132 are divided into bins. A stapling section 141 carries out a stapling process in which sheets are stapled together in accordance with an instruction from the controller 12. Sheet feeding rollers 133 to 136 invert a sheet on which a toner image has been fixed in the case of multiple printing in which a plurality of images are printed on one side of the sheet, or does not invert the sheet in the case of double-sided printing in which images are printed on both sides of the sheet, and then feeds the sheet to the intermediate tray 137. A re-feeding roller 138 conveys the sheet placed on the intermediate tray 137 to the location where the resist roller 126 is disposed.

Figure 3:
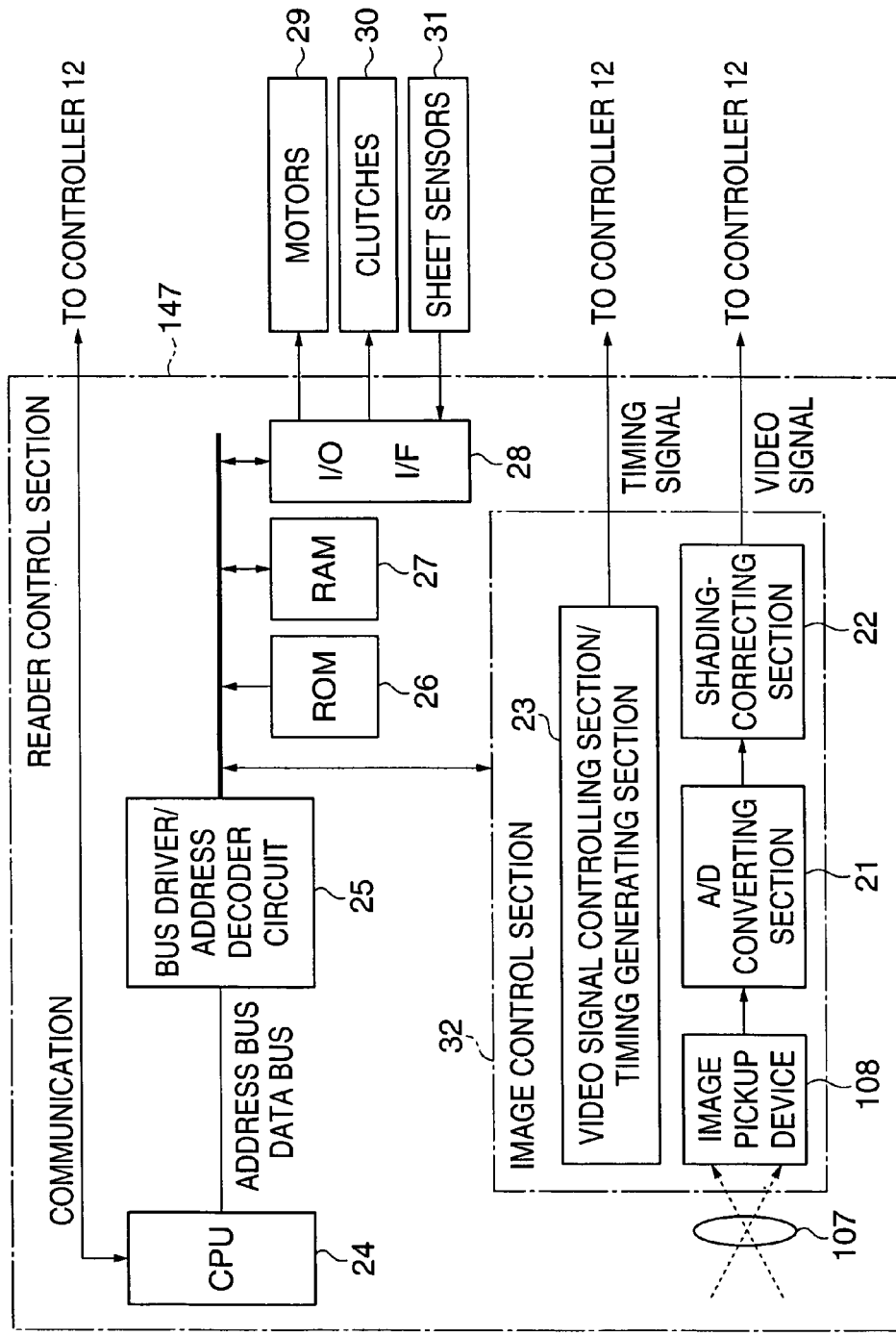
FIG. 3 is a block diagram showing the construction of a reader control section of the image forming apparatus.

FIG. 3 is a block diagram showing the construction of the reader control section 147 of the image forming apparatus 100.

As shown in FIG. 3, the reader control section 147 is comprised of a CPU 24, a bus driver/address decoder circuit 25, a ROM 26, a RAM 27, an input/output interface (I/O I/F) 28, and an image control section 32.

The ROM 26 is a read only memory that stores control programs for controlling the reader section 10. The CPU 24 is a central processing unit that controls the overall operation of the reader section 10 and sequentially reads out and executes the control programs from the ROM 26. The CPU 24 is connected to each load via an address bus and a data bus thereof and the bus driver/address decoder circuit 25. The CPU 24 carries out communication with a CPU 53 of the controller 12 via a reader I/F 63 (see FIG. 4) to share the role of controlling the image forming apparatus 100 with the CPU 53.

The RAM 27 is a random access memory as a main memory used as an input data storage area, a storage area for working, and so forth. The I/O I/F 28 is connected to loads such as motors 29 that drive a feeding system, a conveying system, and an optical system, clutches 30 that transmit driving forces, and sheet sensors 31 that detect sheets being conveyed.

The image control section 32 is comprised of the image pickup device 108, an A/D converting section 21, a shading-correcting section 22, and a video signal control section/timing generating section 23, for correcting/controlling/transferring an image signal. The A/D converter 21 converts an image signal output from the image pickup device 108 from analog form to digital form. The shading-correcting section 22 corrects for variations in pixels. The video signal controlling section/timing generating section 23 controls operation timing of each function of the reader section 10 and controls the transfer of an image signal to the controller 12.

Figure 4:
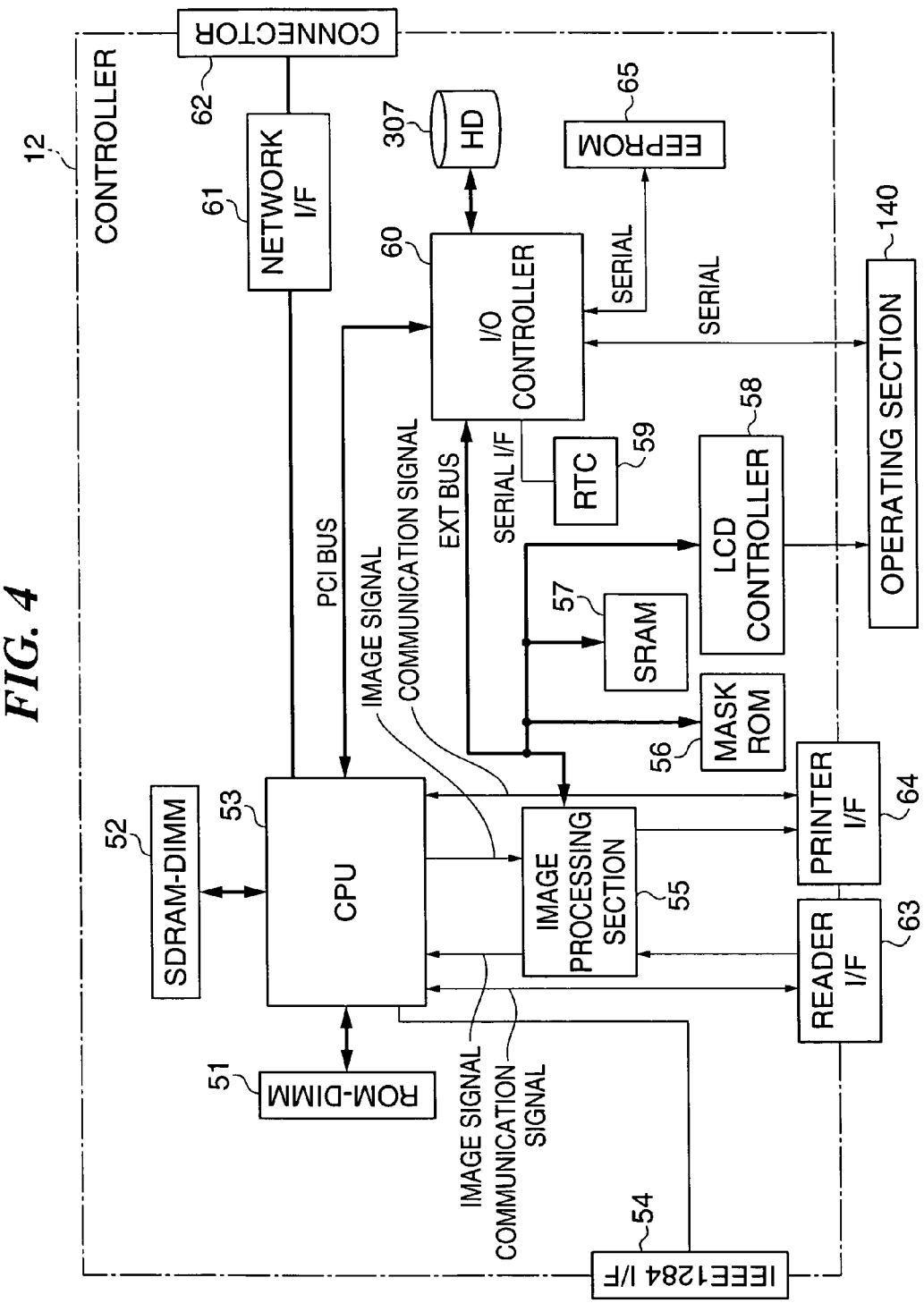
FIG. 4 is a block diagram showing the construction of a controller of the image forming apparatus.

FIG. 4 is a block diagram showing the construction of the controller 12 of the image forming apparatus.

As shown in FIG. 4, the controller 12 is comprised of a ROM-DIMM (Dual Inline Memory Module) 51, a SDRAM-DIMM 52, the CPU 53, an IEEE 1284 interface (I/F) 54, an image processing section 55, a mask ROM 56, a SRAM 57, a LCD controller 58, a RTC (Real Time Clock) 59, an I/O controller 60, a network I/F 61, a 10/100 BASE-T connector 62, the reader I/F 63, a printer I/F 64, an EEPROM 65, and a hard disk (HD) 307.

The CPU 53 is incorporated in a core IC, for centrally controlling the component elements of the controller 12 and the entire image forming apparatus 100. The CPU 53 is equipped with various external I/Fs as well as a compressing/expanding section (see FIG. 7A). The CPU 53 sequentially reads out programs from the ROM-DIMM 51 as a read only memory that stores control procedures (control programs) and executes the readout programs. The I/O controller 60 is connected to the CPU 53 via a PCI (Peripheral Component Interconnect) bus.

The HD 307, the EEPROM 65, the operating section 140, and the RTC 59 are directly connected to the I/O controller 60.

Also, the image processing section 55, the mask ROM 56, the SRAM 57, and the LCD controller 58 are connected to the I/O controller 60 via a data bus/address bus. The loads connected to the I/O controller 60 are controlled in accordance with the programs executed by the CPU 53, in such a manner that control commands are changed into I/F formats corresponding to the respective loads via the PCI bus.

The HD 307 has a storage capacity of, for example, about 10 GB and is comprised of a storage area where control programs are stored, and a storage area for storing image data. Control programs are stored in the ROM-DIMM 51 as well, but they are small in capacity and used only in starting the image forming apparatus 100. After the image forming apparatus 100 is started in accordance with a control program stored in the ROM-DIMM 51, control programs stored in the HD 307 are transferred to the SDRAM-DIMM 52 via the PCI bus so that the image forming apparatus 100 can be controlled in accordance with the transferred control programs.

The control programs for the image forming apparatus 100 are updated by downloading new versions of the control programs into the HD 307 from a PC connected to the image forming apparatus 100 via the IEEE 1284 I/F 54, or a PC connected to the image forming apparatus 100 via the 10/100 BASE-T connector 62.

Figure 8:
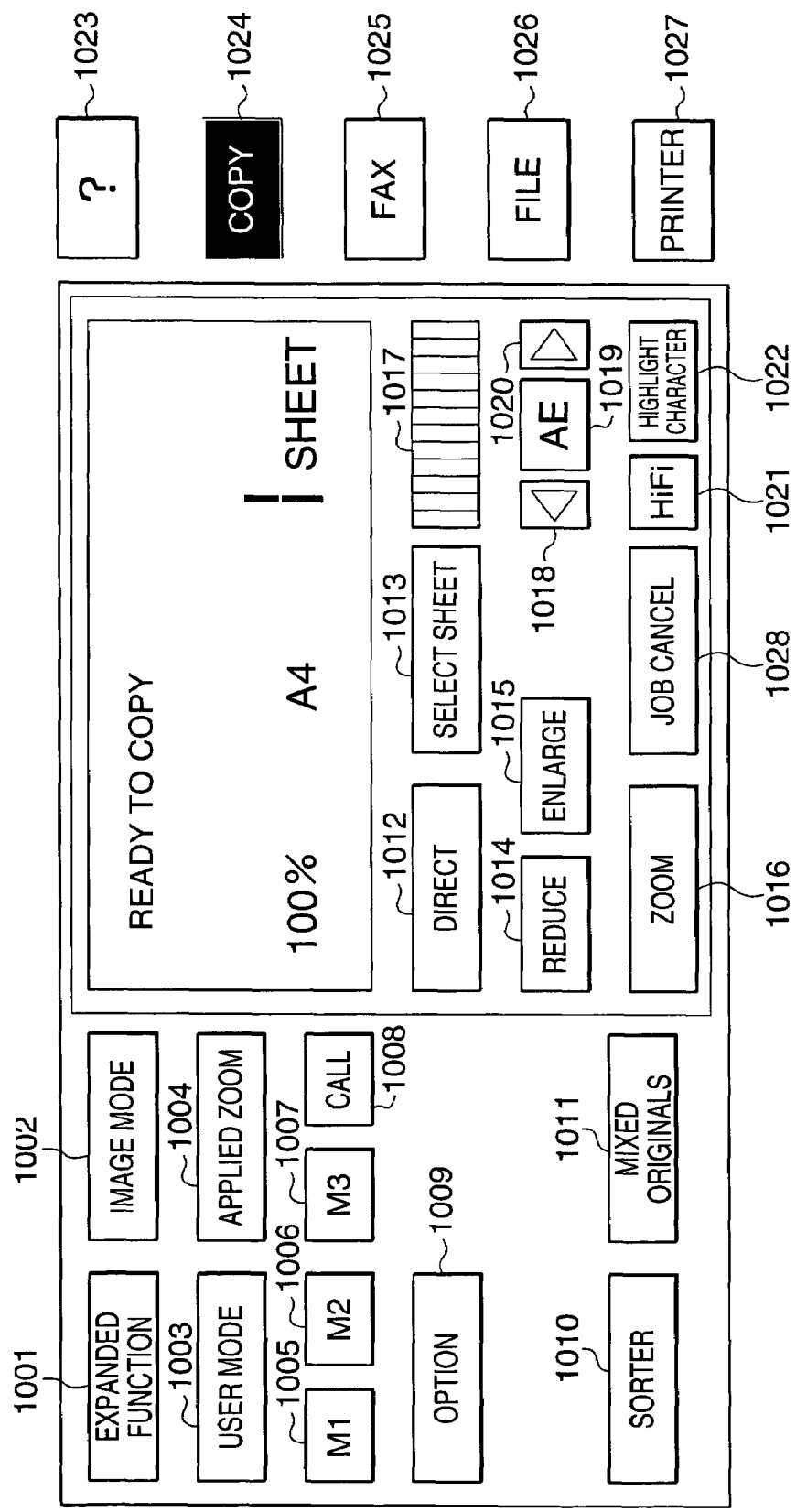
FIG. 8 is a diagram showing a basic screen displayed on an operating section of the image forming apparatus.

The EEPROM 65 is connected to the I/O controller 60. Information on the specification (reading speed, printing speed, language in use, etc.) of the image forming apparatus 100 is written in advance in the EEPROM 65. The RTC 59 serves as a time-measuring section that is backed up by a battery, not shown. The operating section 140 is capable of displaying a basic screen as shown in FIG. 8 and carries out serial communication with the I/O controller 60. The I/O controller 60 detects, for example, depression of keys on the operating section 140. Information to be displayed on the operating section 140 is written into the LCD controller 58 via an external bus and transferred from the LCD controller 58 to the operating section 140, so that the information is displayed on the operating section 140.

The mask ROM 56 stores font data, which is used to, for example, display information on the operating section 140 and to print characters on a sheet. The SRAM 57 is backed up by a battery, not shown, and stores various data. The image processing section 55 performs image processing on an image signal. The image processing is comprised of reader section-associated image processing to be performed on an image input via the reader I/F 63, and printer section-associated image processing to be performed on an image before it is transferred to the printer I/F 64. Examples of the image processing include a magnifying/reducing process, a density converting process, and a binarizing process.

Further, the CPU 53 is connected to a LAN via the network I/F (Ethernet I/F) 61 and the 10/100 BASE-T connector 62, for transmitting and receiving data to and from a PC or the like outside the image forming apparatus. Thus, the CPU 53 is capable of transmitting an image read from an original by the reader section 10 via the LAN and causing the printer section 11 to print the image. The IEEE 1284 I/F 54 is a Centronics I/F that is parallel-connected to a PC, for transmitting and receiving data to and from the PC.

A brief description will now be given of the flow of image processing performed by the controller 12. Image data input from the reader section 10 to the controller 12 via the reader I/F 63 is subjected to various kinds of image processing by the image processing section 55 and input to the SDRAM-DIMM 52 via the CPU 53. The image data that has been stored in the SDRAM-DIMM 52 is read out again by the CPU 53 and subjected to image processing by the image processing section 55 via the CPU 53 to thereby generate image data for output to the printer section 11. The image data is output to the printer section 11 via the printer I/F 64 to form an image on a sheet.

On the other hand, aside from the image formed on the sheet, the image data input from the reader section 10 to the controller 12 via the reader I/F 63 is subjected to various kinds of image processing and is decimated or reduced in accordance with a prescribed scaling size of a VGA (Video Graphics Array) or the like. As a result, thumbnail image data is generated and stored in the SDRAM-DIMM 52.

Also, to make a plurality of copies from an image on an original, the image data input from the reader section 10 to the controller 12 via the reader I/F 63 is stored in the HD 307 via the SDRAM-DIMM 52. Each time one copy is made, the image data is read out from the HD 307 to form an image by the printer section 11. More specifically, the image data that has been stored in the SDRAM-DIMM 52 is read out by the CPU 53 and then compressed by the compressing/expanding section within the CPU 53 and written into another area in the SDRAM-DIMM 52. Then, the compressed image data in the SDRAM-DIMM 52 is stored in the HD 307 via the PCI bus and the I/O controller 60.

In forming an image, the compressed image data read out from the HD 307 is written into the SDRAM-DIMM 52 via the I/O controller 60, the PCI bus, and the CPU 53 in an order reverse to the above. The image data read out from the SDRAM-DIMM 52 is expanded by the compressing/expanding section within the CPU 53 and written again into another area in the SDRAM-DIMM 52. The expanded image data is transferred to the image processing section 55 via the CPU 53 and then transferred to the printer section 11 as described previously.

Figure 5:
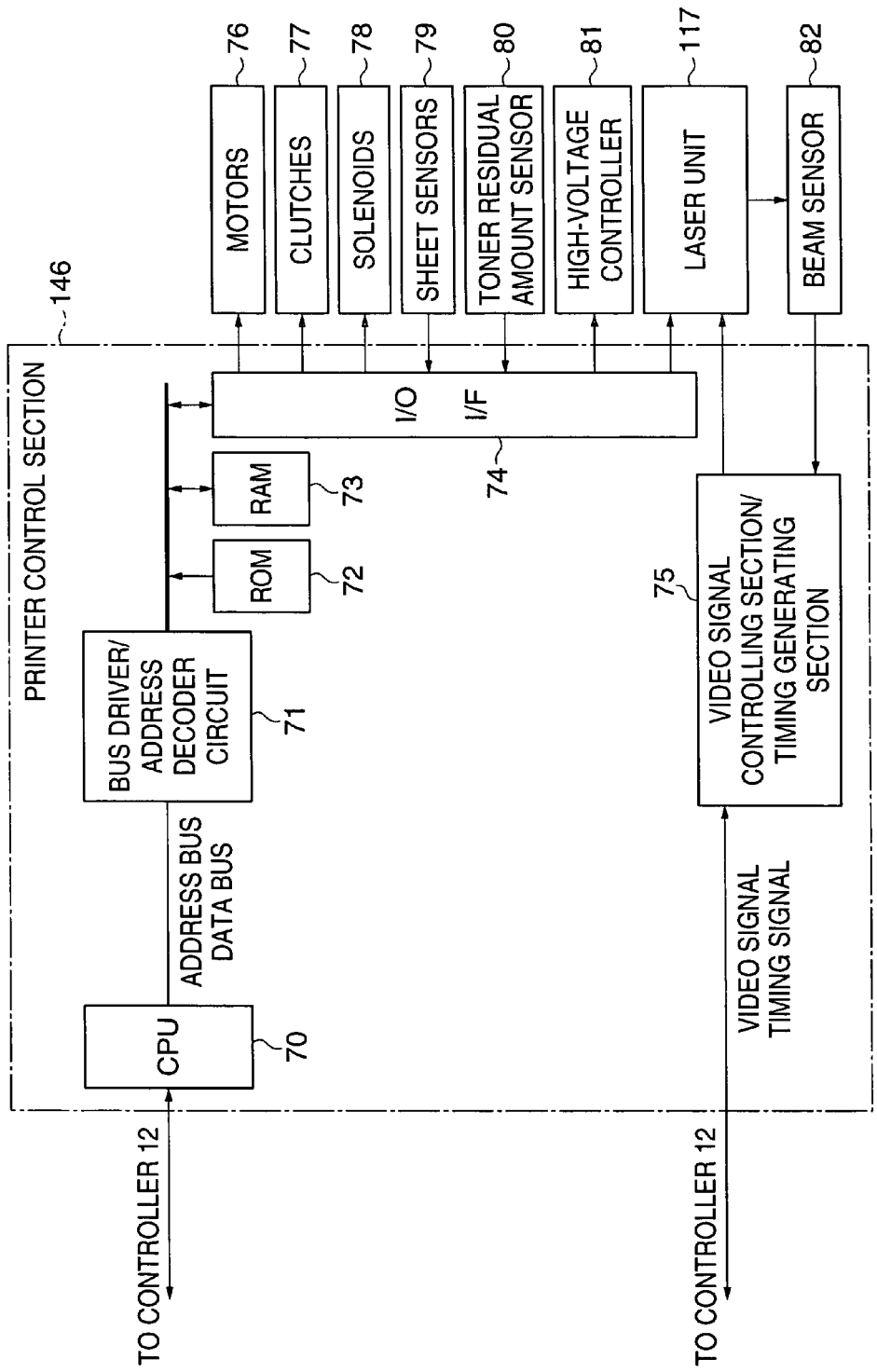
FIG. 5 is a block diagram showing the construction of a printer control section of the image forming apparatus.

FIG. 5 is a block diagram showing the construction of the printer control section 146 of the image forming apparatus 100.

As shown in FIG. 5, the printer controller 146 is comprised of a CPU 70, a bus driver/address decoder circuit 71, a ROM 72, a RAM 73, an I/O I/F 74, a video signal controller/timing generator 75.

The ROM 72 is a read only memory that stores control procedures (control programs) for controlling the printer section 11. The CPU 70 is a central processing unit that controls the overall operation of the printer section 11; the CPU 70 sequentially reads out the control programs from the ROM 72 and executes them. The address bus/data bus of the CPU 70 is connected to each load via the bus driver/address decoder circuit 71. Also, the CPU 70 carries out communication with the CPU 53 of the controller 12 via the printer I/F 64.

The RAM 73 is a random access memory as a main memory used as an input data storage area and a storage area for working. All or part of the RAM 73 is backed up by a battery or the like so that the contents stored in the RAM 73 can be held even when power supply to the image forming apparatus 100 is off. The I/O I/F 74 is connected to loads such as motors 76 that drive a sheet feeding system, a conveying system, and an optical system, clutches 77, solenoids 78, sheet sensors 79 that detect sheets being conveyed, a toner residual amount sensor 80, and a high-voltage controller 81 for image formation. The I/O I/F 74 is also connected to the laser unit 117.

A laser beam produced by the laser unit-117 is irradiated onto and exposes the photosensitive drum 110. In a non-image area of the photosensitive drum 110, a beam sensor (light-receiving sensor) 82 detects the emission state of the laser beam and the position of the laser beam. The detection signal is input to the video signal controller/timing generator

75 to generate a timing synchronization signal. The timing synchronization signal thus generated is output to the controller 12, which then transfers image data to the printer section 11 in accordance with the timing synchronization signal. The image data transferred from the controller 12 is input to the laser unit 117 via the video signal controller/timing generator 75 to form an image.

Figure 6:
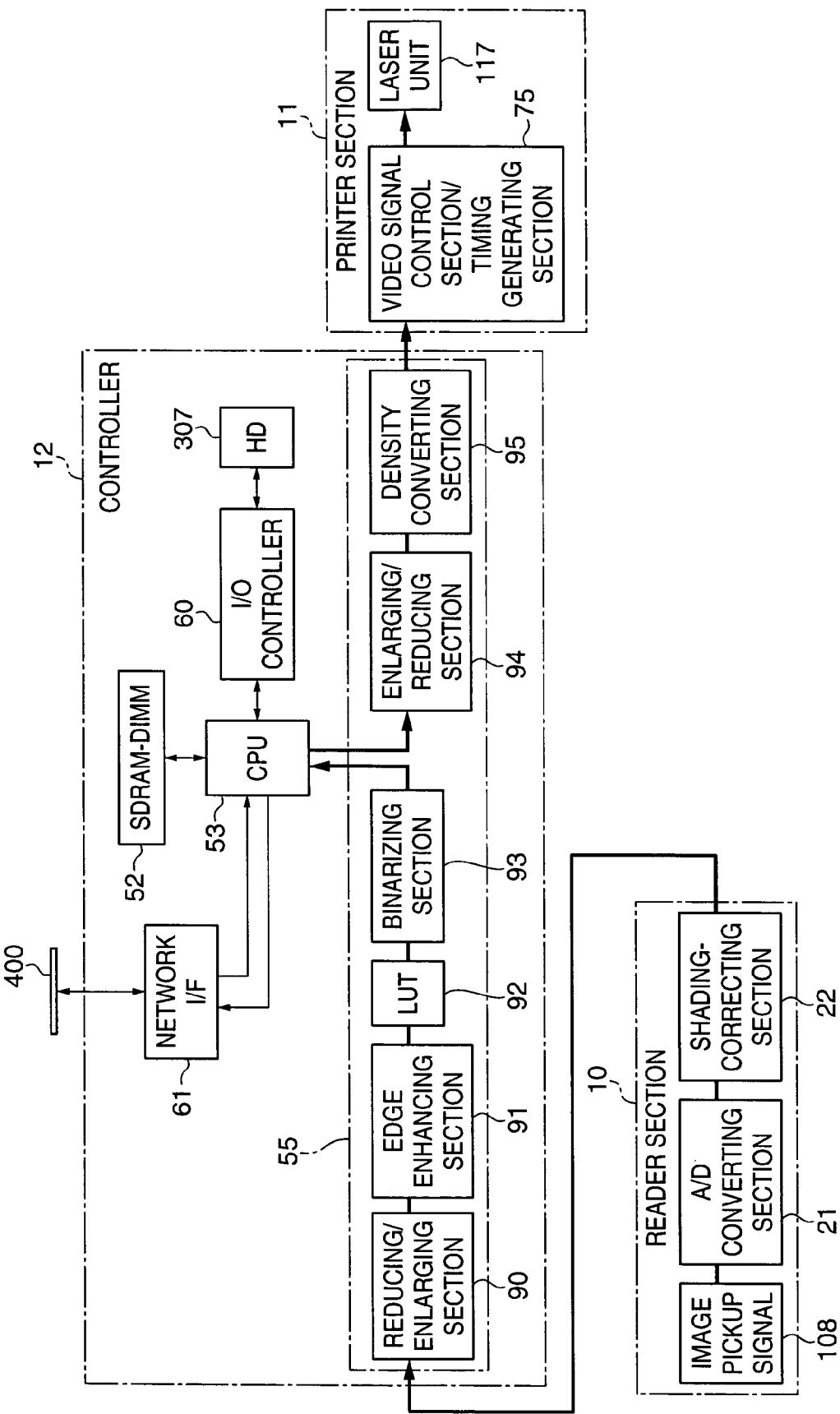
FIG. 6 is a block diagram schematically showing the flow of image data in the image forming apparatus.

FIG. 6 is a block diagram schematically showing the flow of image data in the image forming apparatus 100.

As shown in FIG. 6, an 8-bit image signal converted into an electric signal by the image pickup device 108 in the reader section 10 is converted from analog data to digital data by the A/D converting section 21. Then, variations in pixels of the image data are corrected by the shading-correcting section 22 and input to the image processing section 55 of the controller 12. The image processing section 55 is comprised of a reducing/enlarging section 90, an edge enhancing section 91, a LUT (Look Up Table) 92, a binarizing section 93, an enlarging/reducing section 94, and a density converting section 95. Image processing performed by the image processing section 55 is comprised of reader section-associated image processing and printer section-associated image processing as mentioned above.

The image data from the reader section 10 is input to the reducing/enlarging section 90 of the image processing section 55. For reduced scale copy, the image data is decimated or reduced, and for enlarged scale copy, the image data is interpolated. Then, the edge enhancing section 91 performs secondary differentiation on the image data in a 5×5 (5 lines×5 pixels) window, for example, to thereby enhance image edges. The LUT 92 is intended to perform luminance-to-density conversion; it converts a luminance signal read by the image pickup device 108 into density data for output to the printer section 11 by table search. The LUT 92 also performs density adjustment.

The binarizing section 93 binarizes image data of multiple bits (e.g. 8 bits) that has been input. The binarizing process is intended to reduce the image size and hence reduce the memory capacity required for storing image data in the SDRAM-DIMM 52 (image memory) at a later stage. The binarized image data is temporarily stored in the SDRAM-DIMM 52 via the CPU 53. The CPU 53 controls the SDRAM-DIMM 52 to receive the image data from the reader section 10 and store the same in the SDRAM-DIMM 52, and also reads out the image data stored in the SDRAM-DIMM 52 to cause execution of printer section-associated image processing as the need arises.

The enlarging/reducing section 94 enlarges/reduces binary data, and the density converting section 95 performs density conversion of the binary data. Such image processing is intended mainly for print processing through the operation of a PC. Then, the image data is sent to the laser unit 117 via the printer controller 146 of the printer section 11 so that an image can be formed on a sheet.

The image data stored in the SDRAM-DIMM 52 is compressed by the compressing/expanding section, described later, in the CPU 53. The compressed image data is stored in the HD 307 via the I/O controller 60. As mentioned above, the HD 307 has a storage capacity of about 10 GB and is capable of storing image data equivalent to several thousand pages. In printing the image data stored in the HD 307, the compressed image data is restored to the original image data by the compressing/expanding section in the CPU 53 and output to the printer section 11. The transfer of image data between the SDRAM-DIMM 52 and the HD 307 will be described later in further detail.

The image data that is temporarily stored in the SDRAM-DIMM 52 is output to a LAN 400 via the network I/F 61. The controller 12 is connected to an external PC(s) and a printer(s) via the LAN 400, for transmitting and receiving data to and from the PC(s) and the printer(s). Even in the case where the input of an image from the reader section 10, the output of image data to the printer section 11, the compression/expansion of image data, the transfer of image data between the controller 12 and the HD 307, and the transfer of image data to the LAN 400 are overlapped, they can be performed in parallel if the controller 12 performs reading and writing from and to the SDRAM-DIMM 52 by time-sharing.

Figure 7A:
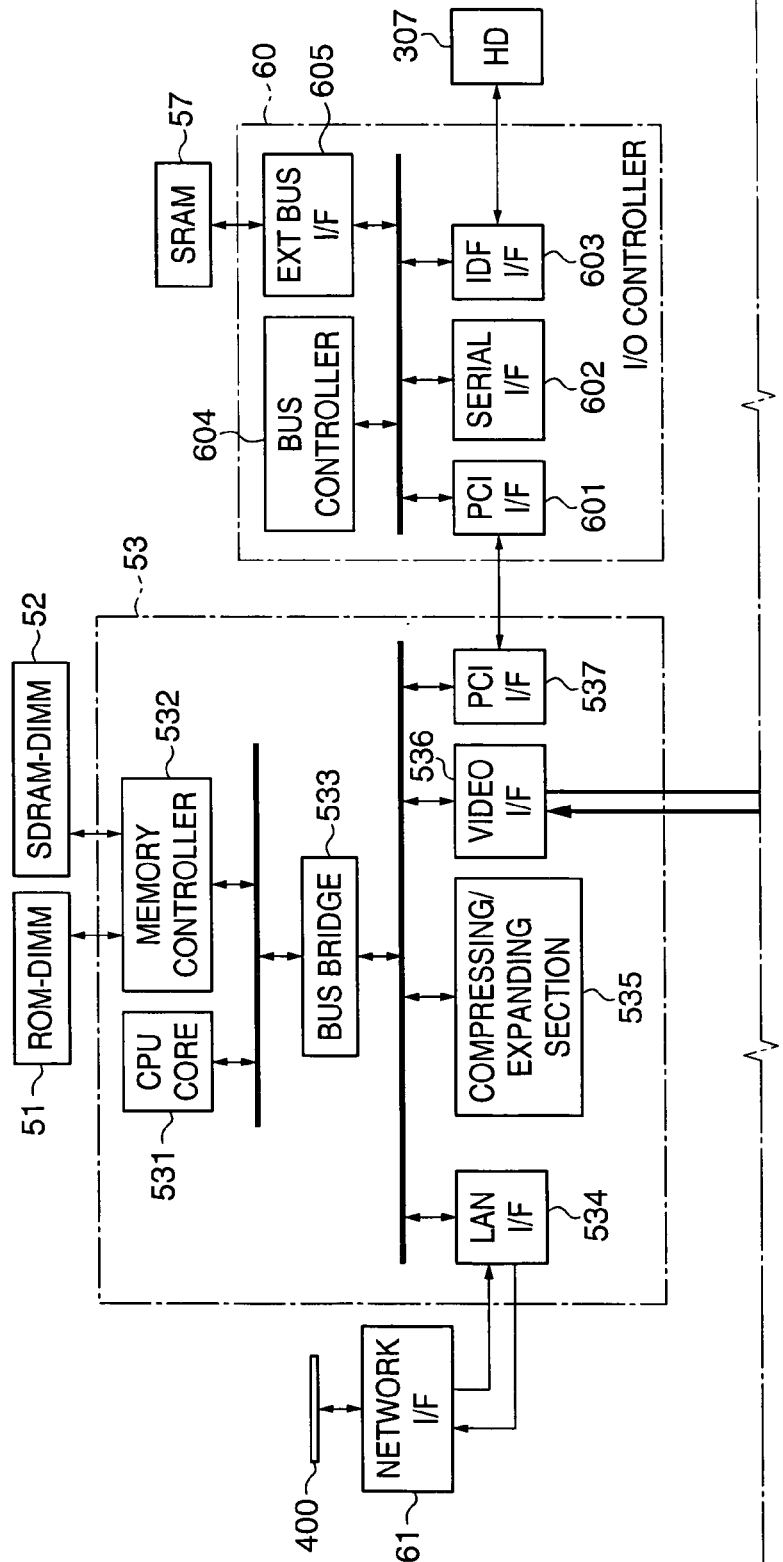
FIGS. 7A and 7B are block diagrams showing in detail the flow of image data in the image forming apparatus.
Figure 7B:
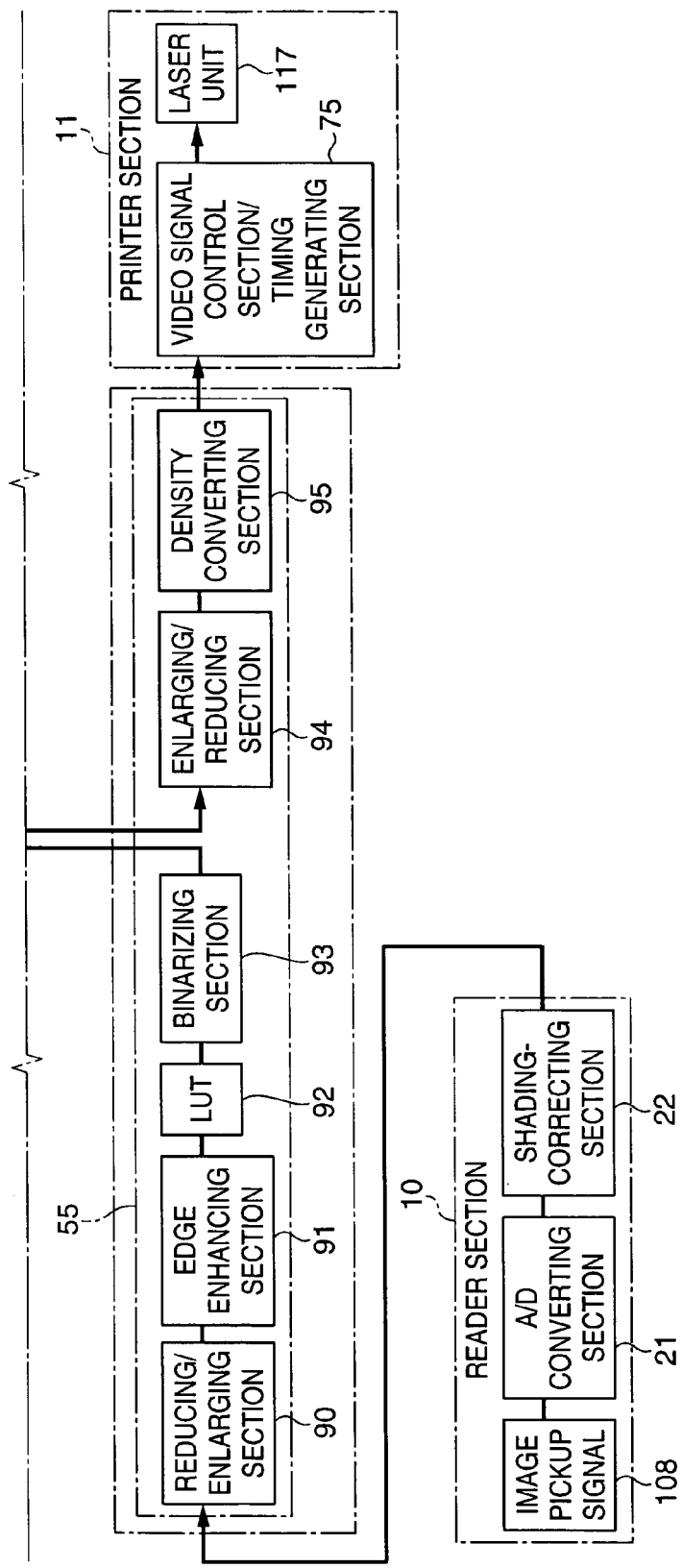

FIGS. 7A and 7B are block diagrams showing in detail the flow of image data in the image forming apparatus 100.

As shown in FIG. 7A, the CPU 53 is comprised of a CPU core 531, a memory controller 532, a bus bridge 533, a LAN I/F 534, a compressing/expanding section 535, a video I/F 536, and a PCI I/F 537. The I/O controller 60 is comprised of a PCI I/F 601, a serial I/F 602, an IDE (Integrated Unit Electronics) I/F 603, a bus controller 604, and an EXT (External) bus I/F 605.

In the CPU 53, the CPU core 531, the memory controller 532, and the bus bridge 533 are connected to an internal bus. The CPU core 531 controls the overall operation. The memory controller 532 controls the ROM-DIMM 51 and the SDRAM-DIMM 52. The bus bridge 533, the LAN I/F 534, the compressing/expanding section 535, the video I/F 536, and the PCI I/F 537 are connected to another internal bus. The LAN I/F 534 has a function of providing interface with the network. The compressing/expanding section 535 has a function of compressing/expanding image data. The video I/F 536 has a function of providing interface for transmitting and receiving image data to and from the image processing section 55. The PCI I/F 537 has a converting function for connecting image data on the internal bus to an external PCI bus.

In the I/O controller 60, the PCI I/F 601, the serial I/F 602, the IDE I/F 603, the bus controller 604, and the EXT bus I/F 605 are connected to an internal bus. The bus controller 604 controls the internal bus. The PCI I/F 601 has a function of providing interface with the external PCI bus. The serial I/F 602 has a function of providing interface with an IC, not shown, that has a serial communicating function. The IDE I/F 603 has a function of controlling the HD 307 and accesses the HD 307 to read out/write data. The EXT bus I/F 605 outputs an external bus signal and can access an IC of the SRAM 57 or the like.

The SDRAM-DIMM 52 has a storage capacity of about 128 to 256 MB, for example. A storage area for e.g. four A4-size images is reserved in the SDRAM-DIMM 52 so that image data (bit image) input to the controller 12 can be written and read out at high speed. Also, a storage area for data storage/working during execution of programs is reserved in the SDRAM-DIMM 52. Therefore, the storage capacity of the SDRAM-DIMM 52 can be expanded in accordance with the expansion of functions.

When the reader section 10 reads an image on an original, the image data is binarized by the binarizing section 93 of the image processing section 55 in the controller section 12 and input to the video I/F 536 and stored in the SDRAM-DIMM 52 via the bus bridge 533 and the memory controller 532. When the printer section 11 performs printing, the image data read out from the SDRAM-DIMM 52 is transmitted to the image processing section 55 via the memory controller 532, the bus bridge 533, and the video I/F 536. Then, the printer 11 forms an image on a sheet.

In storing image data in the HD 307, the image data stored in the SDRAM-DIMM 52 is read out by the memory controller 532 and compressed by the compressing/expanding section 535. The compressed image data is transferred as it is to the I/O controller 60 via the PCI I/F 537. The PCI I/F 601 in the I/O controller 60 stores the image data in the HD 307 via the IDE I/F 603.

In reading out image data from the HD 307, the image data is read out from the HD 307 via the IDE I/F 603 and transferred to the PCI I/F 537 in the CPU 53 via the PCI I/F 601. The image data is then sent to the compressing/expanding section 535 and expanded to be stored in the SDRAM-DIMM 52. In printing, the expanded image data is read out from the SDRAM-DIMM 52, and the image processing section 55 performs print image processing on the image data via the video I/F 536 and outputs the same to the printer section 11.

In the above described way, when image data is transferred between the input device (reader section 10) and the output device (printer section 11) and the mass-storage device (HD 307), the image data is transferred via the SDRAM-DIMM 52 of the controller 12, and therefore, it is possible to compensate for (buffer) a difference in data transfer speed. For this reason, the data transfer speed required for the storage device may be late relative to the operating frequency of the input device. Thus, in access to image data in the HD 307 on a page-by-page basis, even by the use of a storage area on the radially inner side of a disk in the HD 307, it is possible to properly write data into the HD 307 by transferring the data via the SDRAM-DIMM 52.

In the present embodiment, a storage area for image layout in the SDRAM-DIMM 52 is comprised of, for example, a memory 0, a memory 1, a memory 2, and a memory 3. Each of the memories 0 to 3 has such a capacity as to store one page of A4-size image data.

Also, in handling an A4-size original, a double-buffering process (a process in which image data is received using the memory 1 while image data is read out from the memory 0) is carried out using two memories of the SDRAM-DIMM 52, e.g. the memories 0 and 1. In image composition, a form image read from the HD 307 is written into the memory 2, for example.

Also, in the case of an original of a large size such as an A3 size, image data is written by using the memories 0 and 1 of the SDRAM-DIMM 52 as one memory, and in parallel with this, image data is received by using the memories 2 and 3. It should be noted that in the case of an original of the A3 size and image data having a resolution of 600 dpi, a capacity of about 18 MB is required if the image data is binary image data.

Next, a description will be given of a sequence of operations at the start of the image forming apparatus 100.

The reader section 10, the printer section 11, and the controller 12 in the image forming apparatus 100 are each provided with a CPU and control programs. The reader section 10 and the printer section 11 carry out communication with each other via the controller 12, which controls the entire image forming apparatus 100. A description will now be given of sequences of operations of the reader section 10, the printer section 11, and the controller 12 at the start thereof.

The reader section 10 is started based on a program stored in the ROM 26 appearing in FIG. 3. That is, the reader section 10 is started based on default apparatus information (i.e. information indicative of the type of apparatus) designated in the program and makes settings as to the operating period (speed per minute) of the reader section 10, the number of originals subjected to reading, and so forth. Then, the reader section 10 makes a reader startup signal active and notifies the controller 12 that the reader section 10 has been started, and waits until the controller 12 is started.

Upon confirming that the controller 12 has been started, the reader section 10 obtains proper apparatus information from the controller 12 and makes settings again in accordance with the apparatus information in the case where the settings as to the operating period of the reader section 10, the number of originals subjected to reading, and so forth are different from proper setting values. After confirming completion of startup of the controller 12, the reader section 10 starts communication of detailed information with the controller 12. Also, when it is impossible to set data notified from the controller 12, the reader section 10 notifies the controller 12 to this effect and requests a change in set data. This is repeated until the optimum setting is obtained.

The printer section 11 is started based on a program stored in the ROM 72 appearing in FIG. 5. That is, the printer section 11 is started based on default apparatus information designated in the program and makes various settings as to, for example, the number of pages to be printed. Then, the printer section 11 makes a printer startup signal active and notifies the controller 12 that the printer section 11 has been started, and waits until the controller 12 is started.

After confirming that the controller 12 has been started, the printer section 11 obtains proper apparatus information from the controller 12 and makes various settings again. Then, the printer section 11 starts communication of detailed information with the controller 12. Also, when it is impossible to set data notified from the controller 12, the printer section 11 notifies the controller 12 to this effect and requests a change in set data. This is repeated until the optimum setting can be obtained.

The controller 12 is started based on a program stored in the ROM-DIMM 51 comprised of a flash memory or the like by the CPU 53 when power supply to the image forming apparatus 100 is turned on. The controller 12 carries out setting of the PCI bus and initialization of the I/O controller 60 and the like and notifies the reader section 10 and the printer section 11 that the controller 12 has been started.

When a ready signal for the HD 307 is made active and the startup of the HD 307 has been confirmed, the controller 12 transfers a program stored in the HD 307 to the SDRAM-DIMM 52 via the I/O controller 60, the PCI bus, and the CPU 53. When the transfer of the program is finished, the controller 12 starts the program transferred to the SDRAM-DIMM 52. Further, the controller 12 reads out data stored in the HD 307, the SRAM 57, and the like and makes various settings. Then, the controller 12 notifies the reader section 10 and the printer section 11 that the controller 12 has been fully started and starts communication of detailed information.

The reason why the controller 12 that controls the overall operation of the image forming apparatus 100 is started based on the program stored in the ROM-DIMM 51 and then started based on the program stored in the HD 307 is that the program for use in starting the controller 12 is stored in the ROM-DIMM 51. This program causes the controller 12 to start accessing the HD 307. Also, a program for installing the program on the HD 307 is stored in the ROM-DIMM 51.

However, the reason why all the programs such as the control programs for the image forming apparatus 100 are not stored in the ROM-DIMM 51 is that the memory unit cost of the ROM-DIMM 51 is higher than that of the HD 307 and the program capacity is on the increase.

Next, a description will be given of the operating section 140 of the image forming apparatus 100 with reference to FIG. 8.

FIG. 8 is a view showing a basic screen that is displayed on the operating section 140 of the image forming apparatus 100.

As shown in FIG. 8, an expanded function key 1001 is depressed to shift the image forming apparatus 100 into various modes such as double-sided copying, multiple copying, shift, setting of binding margins, setting of frame erase, and so forth. An image mode key 1002 is depressed to shift the image forming apparatus 100 into setting modes in which halftone dot meshing, shading, trimming, and masking are performed on an image to be copied. A user mode key 1003 is depressed to register a mode memory and set a standard mode screen with respect to each user. An applied zoom key 1004 is depressed to shift the image forming apparatus 100 into a mode in which an original is magnified in the X-direction/Y-direction independently of each other or a zoom program mode in which the ratio of magnification/reduction is calculated from the size of an original and the copy size.

A M1 key 1005, a M2 key 1006, and a M3 key 1007 are depressed to call their respective mode memories. A call key 1008 is depressed to call a copy mode that was previously set. An option key 1009 is depressed to set an optional function such as a film projector function for directly making a copy from a film. A sorter key 1010 is depressed to set a sort mode in which sheets on the staple sorter 132 are sorted, a group mode in which sheets are sorted on a group-by-group basis, or the like.

An original mixed key 1011 is depressed to set A4-size and A3-size originals or B5-size and B-4 size originals together on an original feeder. A unity magnification key 1012 is depressed to set the copy magnification to 100%. A reduction key 1014 is depressed to carry out regular size reduction, and an enlargement key 1015 is depressed to carry out regular size enlargement. A zoom key 1016 is depressed to carry out irregular size reduction/enlargement at 1% intervals. A sheet selection key 1013 is depressed to select the type of a copy sheet.

Each time a density key 1018 is depressed, the copy density is increased, and each time a density key 1020 is depressed, the copy density is decreased. A density indicator 1017 changes its indicator position to the right and left when the density key 1018 or 1020 is depressed. An AE key 1019 is depressed to copy an original with a high background density such as a newspaper by automatic density adjustment. A HI/Fi key 1021 is depressed to copy an original with a high halftone density such as a photograph. A character highlight key 1022 is depressed to highlight characters in copying a character original.

A guide key 1023 is depressed to display an explanation of a key when the function of the key is unknown. A copy mode key 1024 is depressed to make a copy. A fax key 1025 is depressed to transmit a facsimile. A file key 1026 is depressed to output file data. A printer key 1027 is depressed to display image data transmitted from an external apparatus such as a PC when the image data is printed out. A job cancel key 1028 is depressed to cancel a print job being executed. Here, the print job is data that includes a sequence of image data based on which an image is to be formed by the image forming apparatus 100 and which is transmitted from a PC (for example, a PC 500, 600, or 700 described later); information related to image data of a plurality of pages is added to the print job. The image forming apparatus 100 that has received a print job from a PC carries out, for example, expansion of intermediate data (for example, PDL data) related to the print job to thereby generate data based on which an image can be formed by the printer section 11 (for example, bit-mapped image data).

Referring next to FIG. 1, a description will be given of a job control system including the image forming apparatus 100 described above.

As shown in FIG. 1, the image forming apparatus 100 is comprised of an alternating current (hereinafter referred to as "AC"). power supply unit 301, a direct current (hereinafter referred to as "DC") power supply 302, a backup power supply 303, a selector switch (hereinafter referred to as "SW") 304, and a power shutdown monitoring circuit 305, as well as the component elements described above with reference to FIGS. 2 to 8. It should be noted that in FIG. 1, the same component elements as those in FIG. 4 and the like are denoted by the same reference numerals, and description thereof is omitted.

The AC power supply unit 301 is a power supply that receives an AC voltage from a commercial power supply and operates AC-associated loads (such as rollers, heater, temperature fuse, etc. constituting the fixing unit 130) via a noise filter. The DC power supply 302 is a power supply that rectifies the AC voltage input from the AC power supply unit 301 and generates various DC voltages for operating DC-associated loads via a converter, a chopper, a regulator, and so forth.

The backup power supply 303 is an auxiliary power supply that takes the place of the DC power supply 302 to supply voltage to the controller 12 including the HD 307 among the DC voltages (direct-current voltages) output from the DC power supply 302 when the supply of electric power from the AC power supply unit 301 to the DC power supply 302 becomes impossible. That is, in the case where the supply of AC voltage from the commercial power supply is shut off, the backup power supply 303 ensures operation required to carry out a terminating process for causing the HD 307 and the like to pause. It should be noted that the backup power supply 303 may be comprised of, for example, a large-capacity capacitor that is normally capable of being charged by the DC power supply 302, or a lithium battery that is capable of operating by itself, because the backup power supply 303 has only to ensure the minimum operation required to carry out a system terminating process when an abnormal power shutdown is detected.

The selector SW 304 is for changing the voltage supply that provides power for the controller 12 from the CD power supply 302 to the backup power supply 303 in accordance with abnormal power shutdown detection control provided between the CPU 53 and the power shutdown monitoring circuit 305 in the controller 12.

The power shutdown monitoring circuit 305 monitors the input from the AC power supply unit 301; when an abnormal power shutdown occurs, the power shutdown monitoring circuit 305 notifies the CPU 53 to this effect, and upon receiving a control signal generated in response to the notification from the CPU 53, the power shutdown monitoring circuit 305 sets a selector signal for the selector SW 304 to switch to the backup power supply 303. It should be noted that the supply of voltage through the switching operation of the selector SW 304 may control the entire controller 12 or may control only parts (for example, only the CPU 53, the SDRAM-DIMM 52, the HD 307, and the I/O controller 60) required for control to reduce the used power supply capacity of the backup power supply 303.

The image forming apparatus 100 is connected to a plurality of PCs 500, 600, and 700 via the 10/100 BASE-T connector 62 and the LAN 400, for communication with the PCs 500 to 700, and executes print jobs transmitted from the PCs 500 to 700.

Referring next to a flow chart of FIG. 9, a description will be given of how the image forming apparatus 100 operates when an unexpected power shutdown has occurred.

Figure 9:
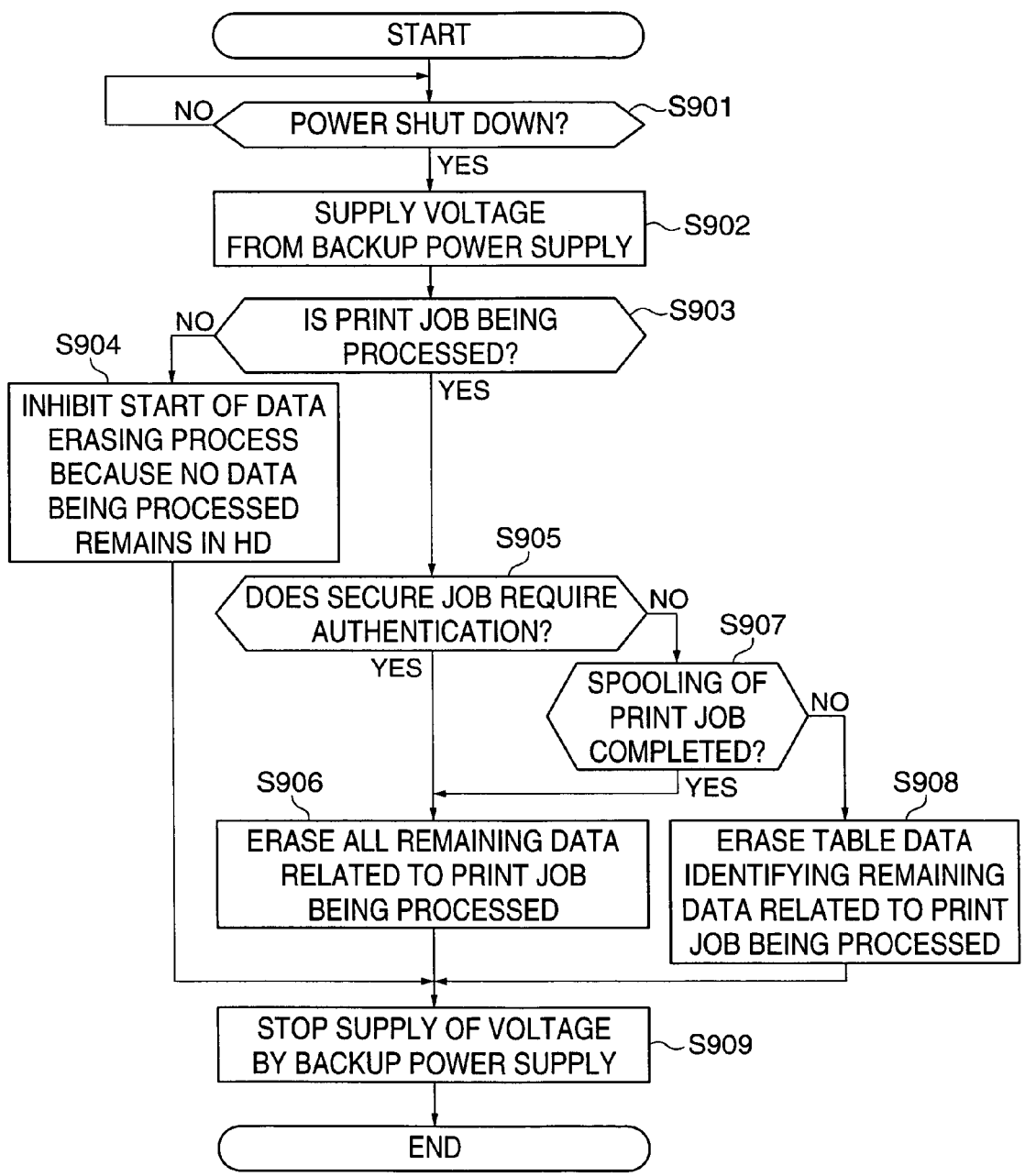
FIG. 9 is a flow chart showing a process in which data in a hard disk is erased in the case where the connection between the image forming apparatus and an AC power supply is shut off due to an unexpected power shutdown.

FIG. 9 is a flow chart showing a process in which data in the HD 307 is erased in the case where the connection between the image forming apparatus 100 and the AC power supply unit 301 is shut off.

As shown in FIG. 9, first, the CPU 53 of the controller 12 determines whether an abnormal power shutdown notification has been received from the power shutdown monitoring circuit 305. If the abnormal power shutdown notification has been received, the CPU 53 determines that the connection between the image forming apparatus 100 and the AC power supply unit 301 as a commercial power supply has been shut off (step S901), and the process proceeds to a step S902. On the other hand, if the abnormal power shutdown notification has not been received, the CPU 53 determines again whether or not the abnormal power shutdown notification has been received (step S901). As an example of the method to monitor abnormal power shutdown, the cross cycle of "0" level voltage in AC voltage input from the AC power supply unit is monitored using a watchdog timer or the like, and when a cycle error occurs except in the ordinary system terminating process, this is notified as an abnormal power shutdown.

As another example of the method to monitor abnormal power shutdown, a resistance for current measurement is connected to an output path of the DC power supply 302, so that a drop in voltage across the resistance is detected and amplified by an amplifier to thereby measure the current value, and when an abnormal change in current occurs except in the ordinary system terminating process, this is notified as an abnormal power shutdown notification. It is to be understood, however, that as the method to monitor abnormal power shutdown, various methods other than the above two methods are known, and the method to monitor abnormal power shutdown by the power shutdown monitoring circuit 305 is not limited to the above ones.

Next, in the step S902, responsive to the notification of the occurrence of the abnormal power shutdown from the power shutdown monitoring circuit 305, the CPU 53 returns a monitoring circuit control signal to the power shutdown monitoring circuit 305 and starts executing a program for carrying out the system terminating process for abnormal power shutdown, which is stored in the SDRAM-DIMM 52.

Here, the system terminating program executed upon abnormal power shutdown may be stored in the ROM-DIMM 51 that stores a control program for startup, or may be stored in the HD 307 so that only the system terminating program can be reloaded from the HD 307 into the SDRAM-DIMM 52 upon receipt of a notification from the CPU 53.

Also, in the step S902, the power shutdown monitoring circuit 305 that has received the monitoring circuit control signal from the CPU 53 sets the selector signal for the selector SW 304 to switch to the backup power supply 303 at this time point, so that the voltage supply that supplies voltage to the controller 12 is changed from the DC power supply 302 to the backup power supply 303.

It should be noted that the system terminating program executed upon abnormal power shutdown is mainly intended to prevent unauthorized access to the HD 307 and to control the I/O controller 60 such that access to the HD 307 is terminated normally to prevent occurrence of bad sector(s) in the HD 307 on the next start-up.

In the present embodiment, control to efficiently change the method of erasing in-process print data on the basis of the statuses of a job processing flag indicative of whether or not there was a print data job being processed at the time point the abnormal power shutdown was detected, a job type flag indicative of the type of the in-process print data job (i.e. a flag indicative of whether or not predetermined authentication information is included in the job), and a job processing progress flag indicative of the progress of the in-process print data job is added to job control.

To carry out the above-mentioned control to efficiently change the data erasing method upon abnormal power shutdown, first, the CPU 53 checks the job processing flag indicative of whether or not a print job is being processed to determine whether or not there was a print job being processed at the time point the abnormal power shutdown was detected (step S903). If it is determined in the step S903 that the job processing flag is off, the data erasing process is not started because no print job being processed remains in the HD 307 (step S904), and therefore, the process proceeds to a step S909. On the other hand, if the job processing flag is on, the process proceeds to a step S905.

In the step S905, the CPU 53 monitors the job type flag to determine whether the job type flag is indicative of a secure job that requests the input of a password by a user (a job that requests the input of a password by a user so as to carry out image formation based on data related to the print job) or a normal job.

If it is determined in the step S905 that the job type flag is indicative of a secure job, the process proceeds to a step S906 wherein the CPU 53 erases all the remaining data in the HD 307 related to the print job being processed within the period of time for which the system terminating process is executed upon abnormal power shutdown, which is determined in consideration of the usable capacity of the backup power supply 303, irrespective of the result obtained from monitoring of the job processing progress flag (step S907).

Here, erasing all the remaining data means erasing not only related table data for the purpose of identifying remaining data such as FAT but also print data itself related to the print job (irrespective of whether the print data is PDL level data or bit-mapped data after drawing). To erase the data, fixed data may be written (overwrite) or scramble data (variable data) may be written over (overwrite) the remaining data in the HD 307.

On the other hand, if it is determined in the step S905 that the job type flag as information indicative of the processing state (status of processing) of the print job is indicative of a normal job, the process proceeds to the step S907.

In the step S907, the CPU 53 monitors the job processing progress flag indicative of whether or not intermediate data related to the print job is being expanded (spooled) to determine whether the print job was still being spooled on a page-by-page basis, or whether the print job had been completely spooled and the concerned pages were being output.

If it is determined in the step S907 that the print job was being spooled, this means that the data remaining in the HD 307 is PDL level data or a drawing command list, and hence a malicious third party is very unlikely to parse the data even when he/she steals a look at the data. Therefore, simplified erasing is carried out such that only related table data such as FAT (information for identifying remaining data related to the print job) is erased among the remaining data in the HD 307 (step S908). It is a matter of course that if there is no need to reduce the capacity of the backup power supply 303 to be used (operating time), the data may be completely erased. In the present embodiment, the principal objective is to change the data erasing method in a more efficient manner so as to reduce the capacity of the backup power supply 303 to be used (operating time).

On the other hand, if it is determined in the step S907 that the print job had been completely spooled, this means that the data remaining in the HD 307 is bit-mapped data after drawing, and hence, even if the data is compressed and stored in the HD 307, it can be extracted by means of software insofar as a compressing/expanding algorithm is known, and therefore, a malicious third party can realistically steal a look at the data. Thus, if the print job had been completely spooled, the print data as well is completely erased within the period of time for which the system terminating process is executed upon abnormal power shutdown, as in the above-mentioned processing of the secure job (step S906).

After completing the control related to erasing in-process data as described above, the CPU 53 controls the I/O controller 60 so as to prevent occurrence of bad sector(s) in the HD 307 due to execution of the system terminating program and completes the execution of the system terminating program. On this occasion, the CPU 53 transmits a monitoring circuit control signal to the power shutdown monitoring circuit 305 to disable the selector SW 304 so that the supply of voltage from the backup power supply 303 to the controller 12 is stopped, causing shutdown of the image forming apparatus 100 including the job control system (step S909).

As described above, according to the first embodiment, when an unexpected power shutdown such as a power failure or an instantaneous interruption over a relatively long period of time occurs in the system, the method of erasing data being processed during execution of the system terminating process after the voltage supply is switched from the DC power supply 302, which is normally used, to the backup power supply 303 is changed in an efficient manner on the basis of the statuses of the job processing flag indicative of whether or not there is an in-process print data job, the job processing progress flag indicative of the progress of the in-process print data job, and the job type flag indicative of the type of the in-process print data job. As a result, it is possible to suppress the capacity of the backup power supply 303 to be used (operating time) and to eliminate the disadvantage that a malicious third party steals a look at data, thus improving security.

A description will now be given of a second embodiment of the present invention.

Figure 10:
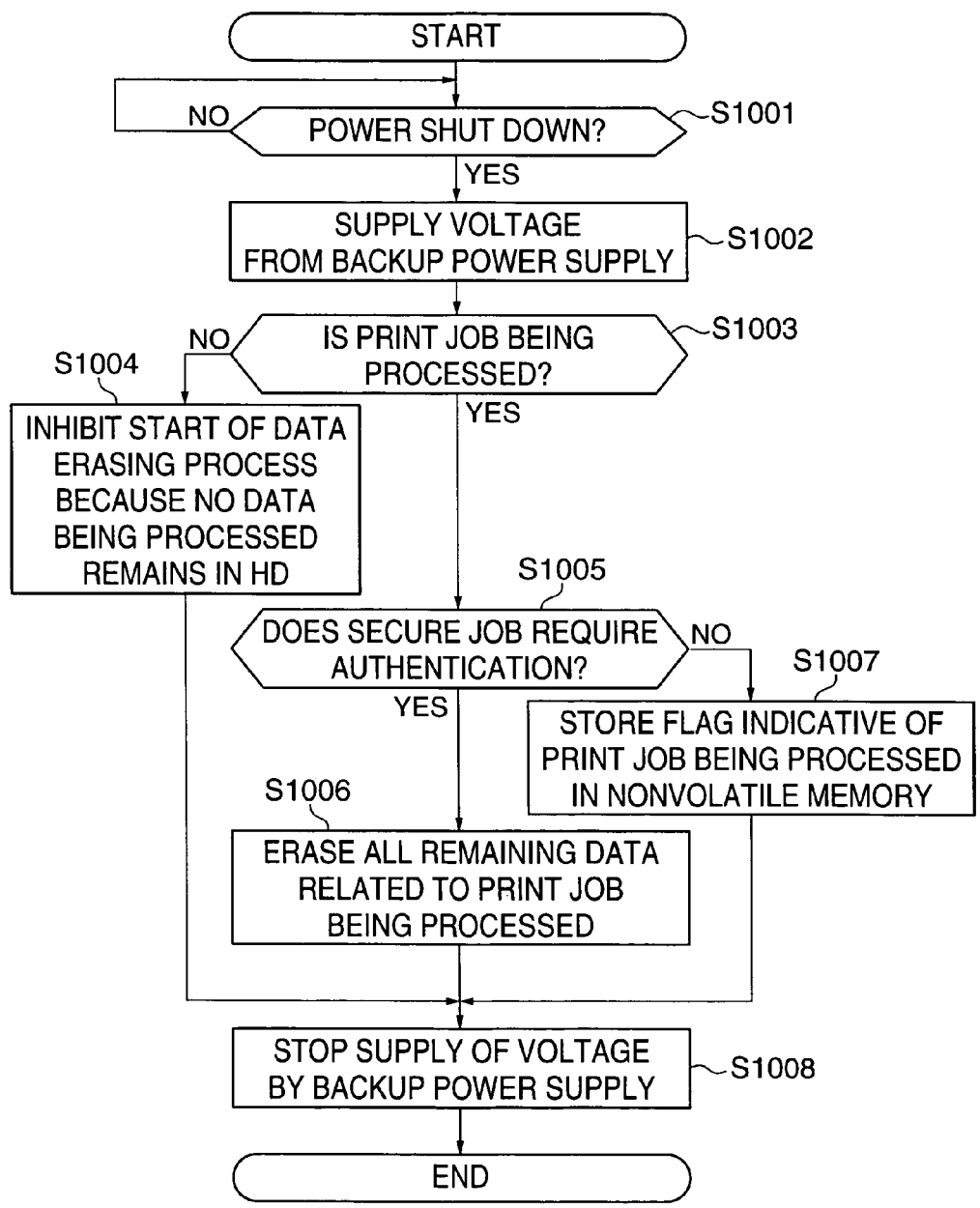
FIG. 10 is a flow chart showing a process in which data in a hard disk is erased in the case where the connection between an image forming apparatus as a data processing apparatus according to a second embodiment of the present invention and an AC power supply is shut off due to an unexpected power shutdown.

The second embodiment differs from the first embodiment described above in that a process shown in a flow chart of FIG. 10 is carried out. The other elements are identical with the corresponding ones of the first embodiment described above (FIGS. 1 to 8), and therefore description thereof is omitted.

FIG. 10 is a flow chart showing a process in which data in the HD 307 is erased when the connection between the image forming apparatus 100 as a data processing apparatus according to the second embodiment and the AC power supply unit 301 is shut off.

As shown in FIG. 10, first, the CPU 53 determines whether or not an abnormal power shutdown notification has been received from the power shutdown monitoring circuit 305. If the notification has been received, the CPU 53 determines that the connection between the image forming apparatus 100 and the AC power supply unit 301 as a commercial power supply has been shut off (step S1001), and the process proceeds to a step S1002. On the other hand, if no abnormal power shutdown notification has been received, the CPU 53 determines again whether or not an abnormal power shutdown notification has been received from the power shutdown monitoring circuit 305 (step S1001).

In the next step S1002, responsive to the notification of the occurrence of abnormal power shutdown from the power shutdown monitoring circuit 305, the CPU 53 transmits a monitoring circuit control signal to the power shutdown monitoring circuit 305 and starts executing a program for carrying out a system terminating process upon abnormal power shutdown, which is stored in the SDRAM-DIMM 52.

Also, in the step S1002, the power shutdown monitoring circuit 305 that has received the monitoring circuit control signal from the CPU 53 sets a selecting signal for the selector SW 304 to switch to the backup power supply 303 at this time point, so that the voltage supply that supplies voltage to the controller 12 is changed from the DC power supply 302 to the backup power supply 303.

Then, the CPU 53 checks the job processing flag indicative of whether or not a print job is being processed and determines whether or not there was a print job being processed at the time point the abnormal power shutdown was detected (step S1003). If it is determined in the step S1003 that the job processing flag is off, the data erasing process is not started because no print job being processed remains in the HD 307 (step S1004), and therefore the process proceeds to a step S1008. On the other hand, if the job processing flag is on, the process proceeds to a step S1005.

In the step S1005, the CPU 53 monitors the job type flag and determines whether the job type flag is indicative of a secure job that requests the input of a password by a user (a job that requests the input of a password by a user so as to carry out image formation based on data related to the print job) or a normal job.

If it is determined in the step S1005 that the job type flag is indicative of a secure job, the CPU 53 erases all the remaining data in the HD 307 related to the print job being processed within the period of time for which the system terminating process is executed upon abnormal power shutdown, which is determined in consideration of the usable capacity of the backup power supply 303 (step S1006).

On the other hand, if it is determined in the step S1006 that the job type flag is indicative of a normal job, the CPU 53 monitors the job processing progress flag indicative of whether or not intermediate data related to the print job is being expanded (spooled) and stores a flag indicative of whether the print job was still being spooled on a page-by-page basis, or whether the print job had been completely spooled and the concerned pages were being output, in a nonvolatile memory (such as the EEPROM 65 or the SRAM 57) (step S1007).

After erasing the remaining data in the step S1006 or storing the flag in the step S1007, the CPU 53 controls the I/O controller 60 so as to prevent occurrence of bad sector(s) in the HD 307 due to execution of the system terminating program and completes the execution of the system terminating program. On this occasion, the CPU 53 transmits a monitoring circuit control signal to the power shutdown monitoring circuit 305 to disable the selector SW 304 so that the supply of voltage from the backup power supply 303 to the controller 12 is stopped, causing shutdown of the image forming apparatus 100 including the job control system (step S1008).

The above described process in which data in the HD 307 is erased according to the second embodiment differs from that of the first embodiment in the operation performed in the step S1007. Specifically, in the second embodiment, in the case of a print job that requires authentication (or requires high confidentiality), when power is supplied from the backup power supply 303 to the controller 12, the remaining data is erased upon power shutdown in the step S1006 to prevent a third party from pirating the data after power shutdown, but when the print job is a normal job that does not require authentication, the job processing progress flag indicative of whether or not intermediate data related to the print job is being expanded (spooled) is merely stored without erasing the remaining data upon power shutdown.

Then, the job processing progress flag stored in the nonvolatile memory in the step S1007 is used to carry out a process shown in FIG. 11, described below, so that the data being spooled can be erased.

FIG. 11 is a flow chart showing a process that is carried out when the image forming apparatus 100 and the AC power supply unit 301 are reconnected to each other and power supply is turned on by the DC power supply 302 after the connection between the image forming apparatus 100 and the AC power supply unit 301 is shut off.

In a step S1101, the CPU 53 determines whether a flag indicative of whether or not a print job is being processed when power is shut down is stored in a nonvolatile memory such as the EEPROM 65 or the SRAM 57. If the flag is stored in the nonvolatile memory, the process proceeds to a step S1102, and if the flag is not stored in the nonvolatile memory, the process proceeds to a step S1103.

In the step S1103, since there is no data remaining in the HD 307, the CPU 53 terminates the process without starting an erasing process in which data in the HD 307 is erased.

On the other hand, since it was determined in the step S1102 that the print job was being processed when power was shut down, the CPU 53 determines whether or not the print job that was being spooled (intermediate data related to the print job was being expanded) according to the flag stored in the nonvolatile memory (such as the EEPROM 65 or the SRAM 57) so as to select an erasing method for erasing the data being processed.

If the CPU 53 determines in the step S1102 that the print job has been completely spooled, the process proceeds to a step S1104. On the other hand, if the CPU 53 determines in the step S1102 that the print job has not been completely spooled, the process proceeds to a step S1105.

In the step S1104, since the print job has been completely spooled and image data that may be stolen is stored in the HD 307, the CPU 53 erases all the remaining data related to the print job that was being processed when power was shut down.

On the other hand, in the step S1105, since the print job has not been completely spooled and image data that may be stolen is not stored as complete data in the HD 307, the CPU 53 erases table data (such as FAT) that identifies remaining data related to the print job that was being processed when power was shut down.

As described above, according to the second embodiment, when an unexpected power shutdown such as a power failure or an instantaneous interruption over a relatively long period of time occurs in the system, the method to erase data being processed during execution of the system terminating process after the voltage supply is switched from the DC power supply 302, which is normally used, to the backup power supply 303 is set to the completely erasing method in the case where a secure job is being processed, whereas in the case where a normal job is being processed, the job processing progress flag is stored in the nonvolatile memory and on the next start-up, the data erasing method is determined based on the status of the job processing progress flag. As a result, as is the case with the first embodiment, it is possible to improve security and to suppress the capacity of the backup power supply 303 to be used when power is shut down, increasing the life of the backup power supply 303.

A description will now be given of a third embodiment of the present invention.

Figure 12A:
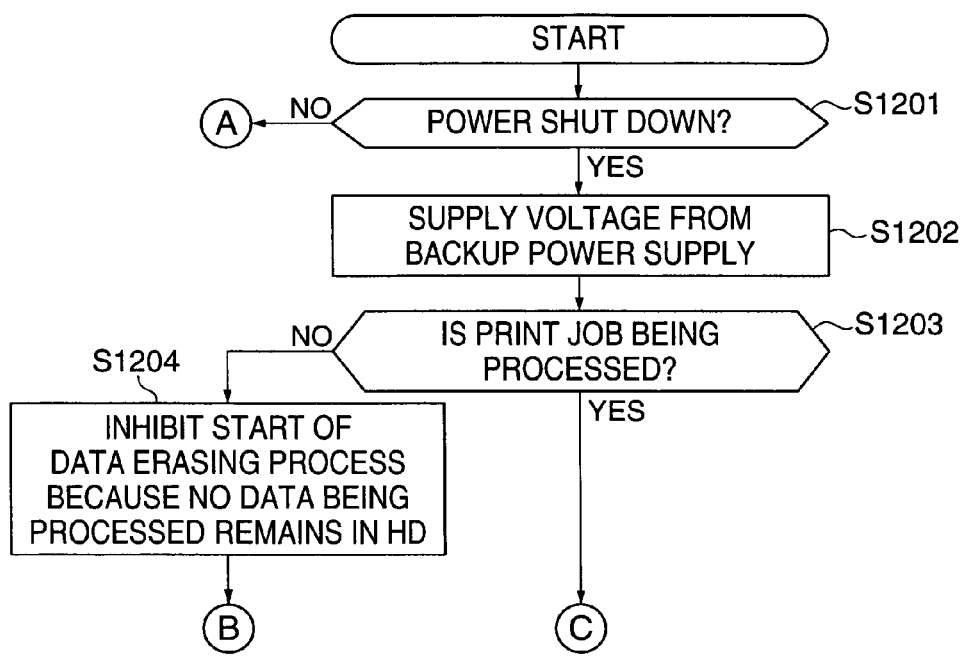
FIGS. 12A and 12B are flow charts showing a process in which data in a hard disk is erased in the case where the connection between an image forming apparatus as a data processing apparatus according to a third embodiment of the present invention and an AC power supply is shut off due to an unexpected power shutdown.
Figure 12B:
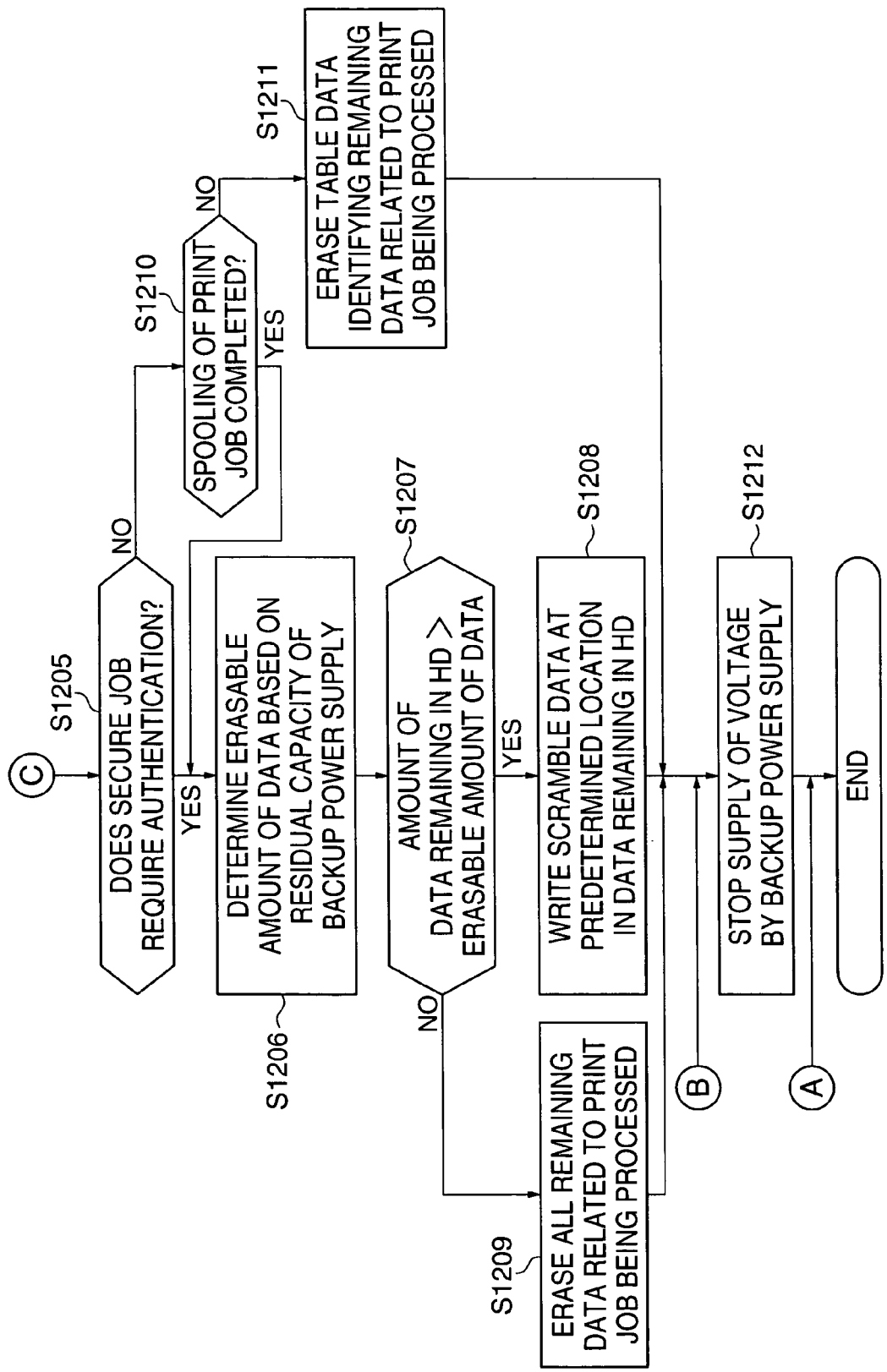

The third embodiment differs from the first embodiment described above in that the power shutdown monitoring circuit 305 has a residual power supply capacity detecting function of checking the residual power supply capacity of the backup power supply 303, and determining the period of time for which the system terminating process is to be executed upon abnormal power shutdown (a function of detecting the amount of electric power that can be supplied to the controller 12 including the HD 307 by the backup power supply 303), and a process shown in flow charts of FIGS. 12A and 12B is carried out. The other elements of the present embodiment are identical with those of the first embodiment described above (FIGS. 1 to 8), and therefore, description thereof is omitted.

FIGS. 12A and 12B are flow charts showing a process in which data in the HD 307 is erased in the case where the connection between the image forming apparatus 100 according to the third embodiment and the AC power supply unit 301 is shut off.

As shown in FIG. 12A, first, the CPU 53 determines whether or not an abnormal power shutdown notification has been received from the power shutdown monitoring circuit 305. If the notification has been received from the power shutdown monitoring circuit 305, the CPU 53 determines that the connection between the image forming apparatus 100 and the AC power supply unit 301 as a commercial power supply has been shut off (step S1201), and the process proceeds to a step S1202. If no abnormal power shutdown notification has been received, the CPU 53 determines again whether or not an abnormal power shutdown notification has been received from the power shutdown monitoring circuit 305 (step S1201).

Next, in the step S1202, responsive to the notification of the occurrence of abnormal power shutdown from the power shutdown monitoring circuit 305, the CPU 53 transmits a monitoring circuit control signal to the power shutdown monitoring circuit 305 and starts executing a program for carrying out the system terminating process upon abnormal power shutdown, which is stored in the SDRAM-DIMM 52.

Also, in the step S1202, the power shutdown monitoring circuit 305 that has received the monitoring circuit control signal from the CPU 53 sets the selecting signal for the selector SW 304 to switch to the backup power supply 303 at this time point, so that the voltage supply that supplies voltage to the controller 12 is changed from the DC power supply 302 to the backup power supply 303.

Then, the CPU 53 checks the job processing flag indicative of whether or not a print job is being processed and determines whether or not there was a print job being processed at the time point abnormal power shutdown was detected (step S1203). If it is determined in the step S1203 that the job processing flag is off, the data erasing process is not started because no print job being processed remains in the HD 307 (step S1204), and therefore the process proceeds to a step S1212. On the other hand, if the job processing flag is on, the CPU 53 monitors the job type flag and determines whether the job type flag is indicative of a secure job that requests the input of a password by a user (a job that requests the input of a password by a user so as to carry out image formation based on data related to the print job) or a normal job (step S1205).

If it is determined in the step S1205 that the job type flag is indicative of a secure job, the process proceeds to a step S1206. On the other hand, if it is determined in the step S1205 that the job type flag is indicative of a normal job, the CPU 53 monitors the job processing progress flag indicative of whether intermediate data related to the print job is being expanded (spooled) (step S1210). If the print job is still being spooled on a page-by-page basis (NO to the step S1210), the process proceeds to a step S1211. On the other hand, if the print job has been completely spooled and the concerned pages are being output (YES to the step S1210), the process proceeds to the step S1206.

In the step S1206, the CPU 53 detects the residual capacity (remaining power supply capacity) of the backup power supply 303 and determines the erasable amount of data based on the detected residual capacity.

Next, in a step S1207, the CPU 53 compares the amount of data remaining in the HD 307 related to the print job being processed, and the erasable amount of data determined in the step S1206 with each other. If the amount of data remaining in the HD 307 related to the print job being processed is larger, the process proceeds to a step S1208, and if not, the process proceeds to a step S1209.

Here, a description will be given of the reason why the amount of data remaining in the HD 307 related to the pint job being processed and the erasable amount of data determined in the step S1206 are compared with each other.

The backup power supply 303 can be a type that secures power supply capacity by charging an electric double-layer capacitor or the like, or a type that secures power supply capacity by using a battery having a predetermined power supply capacity. The backup power supply 303 does not have a predetermined residual capacity when the connection between the image forming apparatus 100 and the AC power supply unit 301 is shut off; the residual capacity varies at different times. It should be noted that an erasing period of time depending on the amount of data is required to erase the data in the HD 307, and the capacity of the backup power supply 303 as a voltage supply that supplies voltage to the controller 12 when the data is erased is consumed in proportion to the erasing period of time.

Because of a limitation imposed upon the capacity of the backup power supply 303, there may occur a case where all the data cannot be erased if the capacity consumed in the period of time required to erase the data is greater than the capacity of the backup power supply 303. In this case, all the remaining data related to the print job being processed cannot be erased, and part of image data related to the print job remains as complete data in the HD 307. Thus, there is the possibility that the image data may be abused. Thus, a suitable measure has to be taken so as to prevent part of image data related to the print job from remaining as complete data depending on the residual capacity of the backup power supply 303.

Therefore, in the step S1206, the CPU 53 detects the residual capacity of the backup power supply 303 and determines the erasable amount of data based on the detected residual capacity, and in the step S1207, the CPU 53 compares the amount of data remaining in the HD 307 related to the print job being processed and the erasable amount of data determined in the step S1206.

In the step S1209, the CPU 53 erases all the remaining data related to the print job being processed because the erasable amount of data determined in the step S1206 is larger than the amount of data remaining in the HD 307 related to the print job being processed, and then the process proceeds to the step S1212.

On the other hand, in the step S1208, since the amount of data remaining in the HD 307 related to the print job being processed is larger than the erasable amount of data determined in the step S1206 and hence all the data remaining in the HD 307 related to the print job cannot be erased due to the insufficient capacity of the backup power supply 303, the CPU 53 writes scramble data (or fixed data) at one or more predetermined locations in the data remaining in the HD 307 so as to prevent part of image data related to the print job from remaining as complete data. Specifically, in the case where the print job includes image data of a plurality of pages, scramble data (or fixed data) at least at part of each page so as to prevent part of the image data from remaining as complete data. The amount of the scramble data to be written is determined according to the erasable amount of data determined in the step S1206.

It should be noted that in the step S1211, the data remaining in the HD 307 is PDL level data or a drawing command list, and hence a malicious third party is very unlikely to parse the data even if he/she steals a look at the data, and therefore, simplified erasing is carried out such that only related table data such as FAT (information for identifying remaining data related to the print job) is erased among the remaining data in the HD 307.

After the execution of the step S1208 or S1209, and S1211, in the step S1212, the CPU 53 controls the I/O controller 60 so as to prevent occurrence of bad sector(s) in the HD 307 due to the execution of the system terminating program and completes the execution of the system terminating program. On this occasion, the CPU 53 transmits a monitoring circuit control signal to the power shutdown monitoring circuit 305 to disable the selector SW 304 so that the supply of voltage from the backup power supply 303 to the controller 12 is stopped, causing shutdown of the image forming apparatus 100 including the job control system (step S1212).

As described above, according to the third embodiment, in the case where an unexpected power shutdown such as a power failure or an instantaneous interruption over a relatively long period of time occurs in the system, the amount of scramble data for erasing in-process data generated during execution of the system terminating process after the voltage supply is switched from the DC power supply 302, which is normally used, to the backup power supply 303 is changed according to the operating time of the backup power supply 303, i.e. the residual power supply capacity of the backup power supply 303. As a result, it is possible to appropriately cope with the phenomenon in which the amount of data that can be erased in the execution of the system terminating process decreases as the operating time of the backup power supply 303 increases and to improve security as is the case with the first embodiment described above.

Although in the first to third embodiments described above, the present invention is applied to control of data erasure upon power shutdown of the image forming apparatus 100 implemented by the copying machine, the present invention is not limited to this, but the present invention may also be applied to control of data erasure upon power shutdown of a mufti-function apparatus or a printer.

Although in the first to third embodiments described above, the CPU 53 of the controller 12 in the image forming apparatus 100 determines whether the concerned job is a secure job or a normal job based on the job type flag, the present invention is not limited to this, but the CPU 53 may determine whether the concerned job is a secure job or a normal job based on security degree information designated by an external apparatus (PC) and transmitted to the image forming apparatus 100.

Although in the third embodiment described above, the power shutdown monitoring circuit 305 has the residual power supply capacity detecting function, the present invention is not limited to this, but the CPU 53 of the controller 12 may have the residual power supply capacity detecting function, or a circuit with the residual power supply capacity detecting function may be separately provided.

It is to be understood that the object of the present invention may also be accomplished by supplying a system or an apparatus with a storage medium in which a program code of software (the flow charts of FIGS. 9, 10, 11, 12A and 12B), which realizes the functions of any of the above described embodiments is stored, and causing a computer or CPU of the system or apparatus to read out and execute the program code stored in the storage medium.

In this case, the above program may be supplied directly from a storage medium that stores the program, or by downloading from another computer, a database, or the like, not shown, connected to the Internet, a commercial network, a local area network, or the like.

The form of the above program may be an object code, a program executed by an interpreter, or script data supplied to an OS (operating system).

In this case, the program code itself read from the storage medium realizes the functions of any of the above described embodiments, and hence the program code and a storage medium on which the program code is stored constitute the present invention.

Examples of the storage medium for supplying the program code include a ROM, a RAM, a NV-RAM, a floppy (registered trademark) disk, a hard disk, a magnetic-optical disk, a CD-ROM, a MO, a CD-R, a CD-RW, a DVD-ROM, a DVD-RAM, a DVD-RW, a DVD+RW, a magnetic tape, and a nonvolatile memory card. Alternatively, the program code may be downloaded via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-275146 filed Sep. 22, 2004, which is hereby incorporated by reference herein.

What is claimed is:

1. A data processing apparatus comprising:
an input unit that inputs data;
a data processing unit that performs predetermined processing on the data input by said input unit;
a nonvolatile storage unit that stores the data on which the processing has been performed by said data processing unit; a first voltage supply unit that supplies voltage to said storage unit;
a second voltage supply unit that supplies voltage to said storage unit when said first voltage supply unit is incapable of supplying voltage to said storage unit;
a selecting unit that selects one of a plurality of erasing processes based on a status of processing of the data on which said data processing unit performs the predetermined processing;
a detecting unit that detects an amount of electric power that can be supplied from said second voltage supply unit to said storage unit, and wherein said selecting unit selects one of the plurality of erasing processes based on the amount of electric power detected by said detecting unit and an amount of the data;
a determining unit that determines an amount of data that can be erased from said storage unit by the amount of electric power detected by said detecting unit, and wherein said selecting unit selects one of the plurality of erasing processes based on whether the amount of the data is greater than the amount of data that can be erased; and
a control unit responsive to said first voltage supply unit becoming incapable of supplying voltage to said storage unit, for controlling said storage unit to erase the data stored in said storage unit using the selected erasing process.

2. A data processing apparatus according to claim 1, comprising an image forming unit that forms an image, and wherein said input unit comprises:
a determining unit that inputs the data received from an external apparatus and determines whether predetermined authentication information is included in the input data; and
an authenticating unit that carries out authentication corresponding to the predetermined authentication information so as to cause said image forming unit to form an image based on the data including the predetermined authentication information.

3. A data processing apparatus according to claim 1, further comprising an image forming unit that forms an image based on data generated by the predetermined processing performed on the data by said data processing unit.

4. A data processing apparatus according to claim 1, wherein said selecting unit, responsive to said first voltage supply unit becoming incapable of supplying voltage to said storage unit, selects one of the plurality of erasing processes for erasing at least part of the processed data stored in said storage unit in the case where the predetermined processing on the data input by said input unit is completed, and selects one of the plurality of erasing processes for erasing table data for identifying the processed data stored in said storage unit in the case where the predetermined processing on the data input by said input unit is not completed.

5. A data erasing method executed by a data processing apparatus, comprising:
an input step of inputting data;
a data processing step of performing predetermined processing on the data input in said input step;
a storage step of storing the data on which the processing has been performed in said data processing step in a storage unit;
a switching step of switching a source of voltage supply to the storage unit from a first voltage supply unit to a second voltage supply unit when the first voltage supply unit is incapable of supplying voltage to the storage unit;
a selecting step of selecting one of a plurality of erasing processes based on a status of processing of the data on which said data processing step performs the predetermined processing;
a detecting step that detects an amount of electric power that can be supplied from said second voltage supply unit to said storage unit, and wherein said selecting step selects one of the plurality of erasing processes based on the amount of electric power detected by said detecting step and an amount of the data;
a determining step that determines an amount of data that can be erased from said storage unit by the amount of electric power detected by said detecting step, and wherein said selecting step selects one of the plurality of erasing processes based on whether the amount of the data is greater than the amount of data that can be erased; and an erasing step of erasing the data in response to the switching of the source of voltage supply from the first voltage supply unit to the second voltage supply unit in said switching step, using the selected erasing process.

6. A data erasing method according to claim 5, comprising an image forming step of forming an image based on data generated by the predetermined processing performed on the data in said data processing step.

7. A data erasing method according to claim 5, wherein said selecting step, in response to the switching of the source of voltage supply from the first voltage supply unit to the second voltage supply unit in said switching step, selects one of the plurality of erasing processes for erasing at least part of the processed data stored in the storage unit in the case where the predetermined processing on the data input in the input step is completed, and selects one of the plurality of erasing processes for erasing table data for identifying the processed data stored in the storage unit in the case where the predetermined processing on the data input in the input step is not completed.

8. A machine readable storage medium for storing a program for causing a computer to implement a data erasing method executed by a data processing apparatus, comprising:

an input module for inputting data;

a data processing module for performing predetermined processing on the data input by said input module;

a storage module for storing the data on which the processing has been performed by said data processing module in a storage unit;

a switching module for switching a source of voltage supply to the storage unit from a first voltage supply unit to a second voltage supply unit when the first voltage supply unit is incapable of supplying voltage to the storage unit;

a selecting module for selecting one of a plurality of erasing processes based on a status of processing of the data on which said data processing module performs the predetermined processing;

a detecting module that detects an amount of electric power that can be supplied from said second voltage supply unit to said storage unit, and wherein said selecting module selects one of the plurality of erasing processes based on the amount of electric power detected by said detecting step and an amount of the data;

a determining module that determines an amount of data that can be erased from said storage unit by the amount of electric power detected by said detecting module, and wherein said selecting module selects one of the plurality of erasing processes based on whether the amount of the data is greater than the amount of data that can be erased; and an erasing module for erasing the data in response to the switching of the source of voltage supply from the first voltage supply unit to the second voltage supply unit by said switching module, using the erasing process.

* * * * *